US010996831B2

(12) United States Patent
Simpkinson et al.

(10) Patent No.: US 10,996,831 B2
(45) Date of Patent: May 4, 2021

(54) AUGMENTED REALITY CURSORS

(71) Applicants: Vulcan Inc., Seattle, WA (US); Jo Lynn Allen

(72) Inventors: Richard Earl Simpkinson, Issaquah, WA (US); Keith Rosema, Seattle, WA (US); Jeffrey Alex Kramer, Redmond, WA (US); Richard Ignacio Zaragoza, Issaquah, WA (US); Paul G. Allen, Mercer Island, WA (US)

(73) Assignee: Vulcan Inc., Seattle, WA (US)

( * ) Notice: Subject to any disclaimer, the term of this patent is extended or adjusted under 35 U.S.C. 154(b) by 0 days.

(21) Appl. No.: 16/386,225

(22) Filed: Apr. 16, 2019

(65) Prior Publication Data
US 2020/0026413 A1 Jan. 23, 2020

Related U.S. Application Data

(60) Provisional application No. 62/692,557, filed on Jun. 29, 2018.

(51) Int. Cl.
G06F 3/0484 (2013.01)
G06F 3/01 (2006.01)

(52) U.S. Cl.
CPC .......... G06F 3/04842 (2013.01); G06F 3/011 (2013.01); G06F 3/017 (2013.01); G06F 2203/04805 (2013.01)

(58) Field of Classification Search
CPC ...... G06F 3/04842; G06F 3/011; G06F 3/017; G06F 2203/04805
See application file for complete search history.

(56) References Cited

U.S. PATENT DOCUMENTS

| 6,396,497 | B1 | 5/2002 | Reichlen |
| 8,643,951 | B1* | 2/2014 | Wheeler ............... G02B 27/017 359/630 |
| 9,035,878 | B1* | 5/2015 | Wheeler ............... G06F 3/0482 345/157 |
| 9,591,427 | B1 | 3/2017 | Lyren et al. |
| 9,709,806 | B2 | 7/2017 | Ishikawa et al. |
| 9,754,168 | B1 | 9/2017 | Henderson |
| 9,916,431 | B2 | 3/2018 | Hwang et al. |
| 10,281,987 | B1* | 5/2019 | Yang ................... G06F 3/04847 |

(Continued)

OTHER PUBLICATIONS

International Invitation to Pay Additional Fees dated Aug. 26, 2019, Patent Application No. PCT/US2019/036181, filed Jun. 7, 2019, 21 pages.

(Continued)

Primary Examiner — Tadesse Hailu
(74) Attorney, Agent, or Firm — Davis Wright Tremaine LLP

(57) ABSTRACT

An augmented reality device enables selection and interaction with multiple objects viewed in an augmented reality scene. A cursor is positioned proximate to a first object in response to a first gesture. A selected state of the first object is determined in response to a second gesture. A visual indication of the selected state of the first object is displayed by the augmented reality device. A second position for the cursor, proximate to a second object, is determined. A visual indication of the first object's selected state remains displayed after the cursor is moved to be proximate to the second object.

20 Claims, 14 Drawing Sheets

(56) References Cited

U.S. PATENT DOCUMENTS

| | | | |
|---|---|---|---|
| 10,318,034 B1* | 6/2019 | Hauenstein | G06F 3/04842 |
| 10,475,224 B2 | 11/2019 | Liang | |
| 10,488,218 B2 | 11/2019 | Kim et al. | |
| 10,572,215 B1 | 2/2020 | Cooper et al. | |
| 10,585,294 B2 | 3/2020 | Youngstrom et al. | |
| 10,649,212 B2 | 5/2020 | Burns et al. | |
| 10,831,030 B2* | 11/2020 | Stellmach | G06F 3/013 |
| 2003/0020707 A1* | 1/2003 | Kangas | G06F 3/011 |
| | | | 345/418 |
| 2006/0038833 A1 | 2/2006 | Mallinson et al. | |
| 2011/0197161 A1* | 8/2011 | Mattingly | G06F 3/04842 |
| | | | 715/810 |
| 2011/0285704 A1 | 11/2011 | Takeda et al. | |
| 2012/0075343 A1 | 3/2012 | Chen et al. | |
| 2013/0212488 A1 | 8/2013 | Scherpa | |
| 2013/0246967 A1 | 9/2013 | Wheeler et al. | |
| 2013/0293490 A1* | 11/2013 | Ward | G06F 3/0421 |
| | | | 345/173 |
| 2013/0293580 A1* | 11/2013 | Spivack | G06K 9/00671 |
| | | | 345/633 |
| 2014/0006631 A1 | 1/2014 | Meskauskas et al. | |
| 2014/0096215 A1 | 4/2014 | Hessler | |
| 2014/0204117 A1 | 7/2014 | Kinnebrew et al. | |
| 2014/0225918 A1 | 8/2014 | Mittal et al. | |
| 2014/0267419 A1 | 9/2014 | Ballard et al. | |
| 2014/0320389 A1 | 10/2014 | Scavezze et al. | |
| 2015/0046296 A1 | 2/2015 | Hart | |
| 2015/0153571 A1 | 6/2015 | Ballard et al. | |
| 2015/0179186 A1 | 6/2015 | Swierk et al. | |
| 2015/0199081 A1 | 7/2015 | Wheeler | |
| 2015/0205106 A1 | 7/2015 | Norden | |
| 2015/0206321 A1 | 7/2015 | Scavezze et al. | |
| 2015/0248783 A1 | 9/2015 | Fayle | |
| 2015/0356787 A1 | 12/2015 | Abe et al. | |
| 2016/0025982 A1 | 1/2016 | Sutherland et al. | |
| 2016/0026242 A1 | 1/2016 | Burns et al. | |
| 2016/0071320 A1 | 3/2016 | Smith | |
| 2016/0116995 A1* | 4/2016 | Wilson | G06F 3/017 |
| | | | 345/157 |
| 2016/0132189 A1 | 5/2016 | Choi et al. | |
| 2016/0212138 A1 | 7/2016 | Lehane | |
| 2016/0239252 A1 | 8/2016 | Nakagawa et al. | |
| 2017/0068416 A1* | 3/2017 | Li | G06F 3/04812 |
| 2017/0123504 A1* | 5/2017 | Kim | G06F 3/017 |
| 2017/0236320 A1 | 8/2017 | Gribetz et al. | |
| 2017/0256096 A1 | 9/2017 | Faaborg et al. | |
| 2017/0312032 A1 | 11/2017 | Amanatullah et al. | |
| 2017/0323158 A1* | 11/2017 | Gordon | G06Q 30/06 |
| 2017/0324841 A1 | 11/2017 | Clement et al. | |
| 2017/0336882 A1 | 11/2017 | Tome et al. | |
| 2018/0046352 A1* | 2/2018 | Johnson | G06F 3/04815 |
| 2018/0066956 A1 | 3/2018 | Kim et al. | |
| 2018/0150892 A1 | 5/2018 | Waldron et al. | |
| 2018/0150899 A1 | 5/2018 | Waldron et al. | |
| 2018/0150903 A1 | 5/2018 | Waldron et al. | |
| 2018/0181810 A1 | 6/2018 | Jhawar et al. | |
| 2018/0182142 A1 | 6/2018 | Lim et al. | |
| 2018/0314889 A1 | 11/2018 | Fukazawa et al. | |
| 2018/0315248 A1 | 11/2018 | Bastov et al. | |
| 2018/0322706 A1 | 11/2018 | Drouin et al. | |
| 2018/0330515 A1 | 11/2018 | Stall et al. | |
| 2018/0350144 A1 | 12/2018 | Rathod | |
| 2019/0026874 A1 | 1/2019 | Jin et al. | |
| 2019/0065027 A1* | 2/2019 | Hauenstein | G06F 3/0484 |
| 2019/0073831 A1 | 3/2019 | Kim | |
| 2019/0073832 A1 | 3/2019 | Kim | |
| 2019/0087973 A1* | 3/2019 | Kaehler | G06F 3/0346 |
| 2019/0099678 A1 | 4/2019 | Khan et al. | |
| 2019/0108578 A1 | 4/2019 | Spivack et al. | |
| 2019/0114051 A1 | 4/2019 | McBeth | |
| 2019/0114052 A1 | 4/2019 | McBeth | |
| 2019/0205645 A1 | 7/2019 | Bates et al. | |
| 2019/0237044 A1* | 8/2019 | Day | G06F 3/147 |
| 2019/0310756 A1* | 10/2019 | Vathauer | G06F 3/04842 |
| 2019/0310757 A1 | 10/2019 | Lee et al. | |
| 2019/0339837 A1 | 11/2019 | Furtwangler | |
| 2019/0339840 A1 | 11/2019 | Park et al. | |
| 2019/0340816 A1 | 11/2019 | Rogers | |
| 2019/0340818 A1 | 11/2019 | Furtwangler | |
| 2019/0340833 A1 | 11/2019 | Furtwangler et al. | |
| 2019/0342632 A1 | 11/2019 | DeFaria et al. | |
| 2019/0347865 A1 | 11/2019 | Hackett et al. | |
| 2019/0361521 A1* | 11/2019 | Stellmach | G06F 3/013 |
| 2019/0361797 A1 | 11/2019 | Yerli | |
| 2019/0369716 A1 | 12/2019 | Chen et al. | |
| 2020/0005026 A1 | 1/2020 | Andersen et al. | |
| 2020/0012107 A1 | 1/2020 | Greenberg | |
| 2020/0019295 A1 | 1/2020 | Spivack et al. | |
| 2020/0035203 A1 | 1/2020 | Kosik et al. | |
| 2020/0051338 A1 | 2/2020 | Zia et al. | |
| 2020/0097068 A1 | 3/2020 | Hamidi-Rad et al. | |
| 2020/0103962 A1 | 4/2020 | Burns | |
| 2020/0111232 A1 | 4/2020 | Bleyer et al. | |
| 2020/0111256 A1 | 4/2020 | Bleyer et al. | |
| 2020/0117900 A1 | 4/2020 | Deng et al. | |

OTHER PUBLICATIONS

International Search Report and Written Opinion dated Oct. 10, 2019, Patent Application No. PCT/US2019/036182, filed Jun. 7, 2019, 15 pages.

International Search Report and Written Opinion dated Oct. 21, 2019, Patent Application No. PCT/US2019/036181, filed Jun. 7, 2019, 25 pages.

\* cited by examiner

AUGMENTED REALITY CURSORS

CROSS-REFERENCE TO RELATED APPLICATIONS

This application claims the benefit of U.S. Provisional Patent Application No. 62/692,557, filed Jun. 29, 2018.

BACKGROUND

Augmented reality is a relatively new technology which involves incorporating computer-generated graphics into a view of a user's real physical environment. Typically, augmented reality applications are performed with devices such as smartphones or goggles, which incorporate a camera for capturing an image of the user's physical environment, and a display for presenting the augmented view. The capabilities of such applications, however, are often limited by the available means by which the user may interact with the environment.

BRIEF DESCRIPTION OF THE DRAWINGS

Various techniques will be described with reference to the drawings, in which.

DETAILED DESCRIPTION

Figure 1:
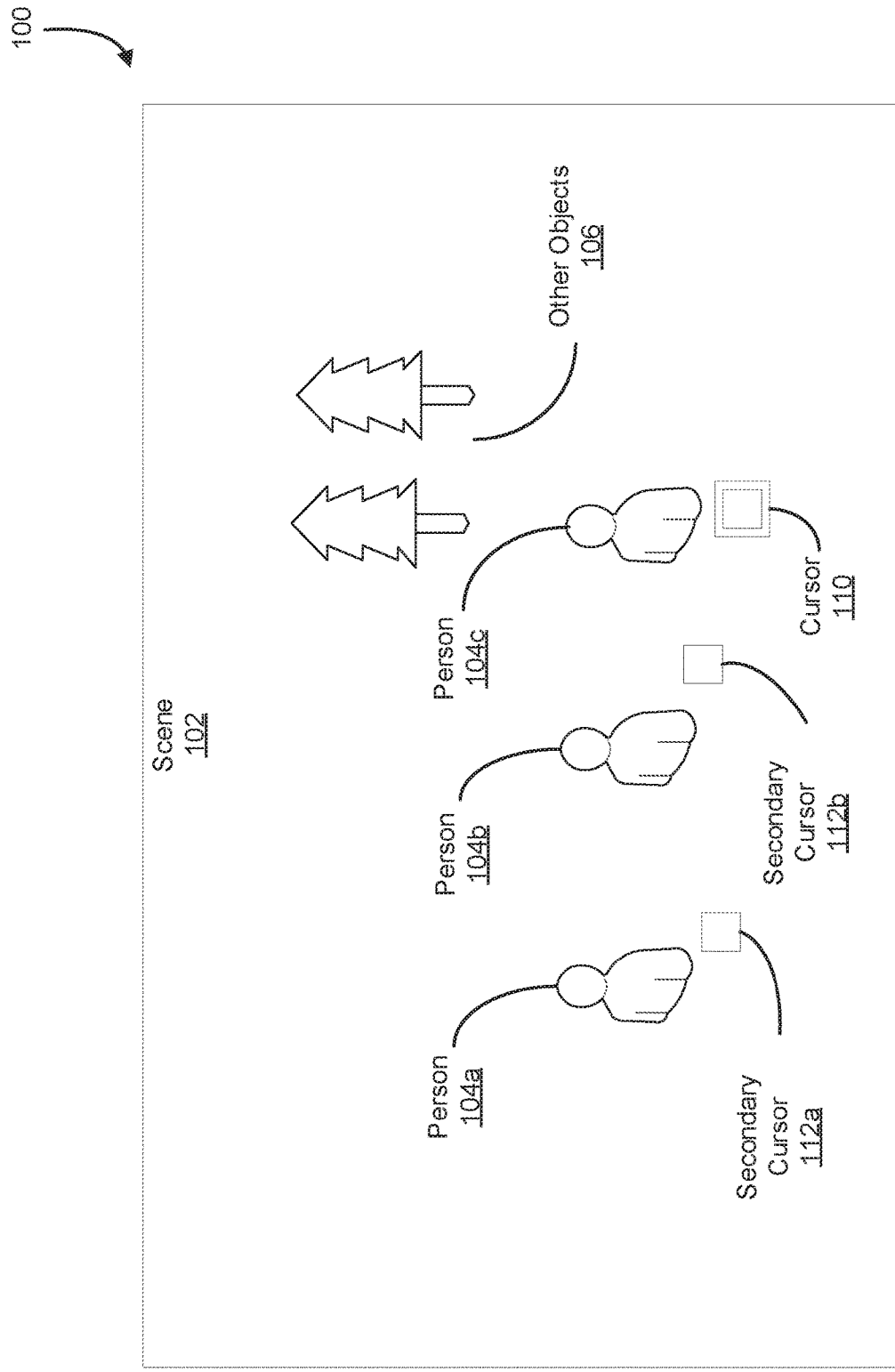
FIG. 1 illustrates an example of augmented reality cursors, in accordance with an embodiment.

Techniques and systems described below relate to improvements to the means by which users can interact with augmented reality devices. In one example, techniques for selecting multiple objects within a scene are described. In another example, techniques for presenting available modes of interaction with objects in a scene, using attachable cursors, are described. In other examples, techniques for facilitating accomplishment of user goals and enhancing user safety are described.

In an embodiment, an augmented reality device comprises at least one processor and a memory. The memory stores executable instructions that, when executed by the processor of the augmented reality device, cause the augmented reality device to facilitate selection of multiple objects within an augmented reality scene. Execution of the instructions causes the processor to display a cursor near a first object in a virtual reality scene. The cursor might be positioned near the first object in response to a gesture made by the device's user, for example. In response to a second gesture, the device displays a graphical element or device indicating that the first object has been selected. The cursor is then positioned proximate to a second object, but the visual indication of the first object's selected state remains displayed after the cursor is moved.

For example, in an embodiment, an augmented reality cursor is presented to the user and is manipulated by the user to identify an object of interest. Based on another input gesture, such as a pause in eye movement, voice input, manipulation of a control, and so forth, the cursor becomes attached to the object of interest. In response to subsequent eye movement, the cursor splits in two, leaving a marker on the object to indicate that the object was selected, and moving to another object to indicate that this second object might also be selected. The user then proceeds to select this and other objects using the same technique. Various actions may then be taken on the set of selected objects.

In an embodiment, an augmented reality cursor changes modes based on identification of a proximate object and a determination of available modes of interacting with those objects. Here, the object being proximate means that it is close to a cursor. A mode of interaction can be determined based on an analysis or classification of an object that is close to the cursor. For example, based on classification of an object in the scene as a group of objects, the cursor mode may change to a "magnifying glass mode" which facilitates fine-grained selection of individual objects within the group. Other examples of mode changes include indications that additional information is available about the object, indications that objects of like type can be multi-selected, and so on.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, especially the field of augmented reality, by providing improved mechanisms for user interaction with an augmented reality device. Moreover, techniques described and suggested in the present disclosure are necessarily rooted in computer technology in order to overcome problems specifically arising in augmented reality devices.

FIG. 1 illustrates an example of augmented reality cursors, in accordance with an embodiment. In the example 100, an augmented reality scene 102 is captured by an augmented reality device. Augmented reality refers to the integration of computer-generated elements into a real-world environment. An augmented reality device provides this integration. For example, an augmented reality device may comprise a video camera, a microphone, a video display, and a speaker. The augmented reality device may capture video and audio of the surrounding environment, using the video camera and microphone. The augmented reality device may further generate, or cause to be generated, additional visual and/or audio elements and integrate those into an environment presented to a user of the augmented reality device, using the video display and speaker. An augmented reality scene, which may also be described herein as a scene, includes the display visible to the user of an augmented reality device, and may include both real and enhanced depictions of objects, as well as artificially generated objects.

Continuing with the example 100, the scene 102 represents the environment of the augmented reality device, along with the generated elements. For example, a video display of an augmented reality device might comprise elements corresponding to those depicted in the scene 102 of example 100. It should be noted that both the environment of the augmented reality device and the depicted scene 102 are dynamic. For example, the augmented reality device may be reoriented or repositioned in space, and the people 104 and objects 106 in the scene may move.

The augmented reality device may project a cursor 110 into the environment in order to facilitate interaction with the scene 102. For example, the augmented reality device may support gestures or input mechanisms which facilitate positioning of the cursor 110 within the scene, and further gestures or input mechanisms which facilitate activation of cursor functions. Various input gestures may be used, including but not limited to eye movement, hand movement, speech, and so on.

In an embodiment, eye gaze gestures are used to position the cursor near a person 104a, and an eye hover gesture used to activate a cursor function. Here, eye gaze refers to the user directing his or her vision to look at the person 104a in a scene, and eye hover refers to pausing eye movement more than a threshold amount of time, so that the user's gaze remains focused on the person 104a during that period.

In an embodiment, the eye hover gesture causes activation of the cursor function. In the example 100 of FIG. 1, the activation causes a secondary cursor 112 to become attached to the person 104a. Attaching to the object comprises identifying the person 104a within the scene, tracking the movement of the person 104a within the scene, and displaying a secondary cursor 112 in the proximity of the person 104a. The augmented reality device maintains the position of the secondary cursor 112a with respect to the person 104a, even as the person moves about the scene 102.

In an embodiment, after the secondary cursor 112 is attached to the person 104a, the augmented reality device continues to track the user's eye gaze as it moves to another position. While this happens, the secondary cursor 112a remains attached to the person 104a, as the user's eye movement causes the primary cursor 110 to move about the scene 102. Here, the secondary cursor 112a acts as an indication of a selected state of the person 104a.

Multiple objects within the scene 102 may be selected in this manner. For example, after secondary cursor 112a was attached to a first person 104a, the user might gaze at a second person 104b, activate the cursor function by pausing his or her gaze momentarily, and thereby cause an additional secondary cursor 112b to be attached to the second person 104b. This might be repeated again with respect to a third person 104c, and so on. The augmented reality device can maintain the attachment of each secondary cursor 112, even as the associated people 104 move about the scene, while further selections are accomplished.

In an embodiment, an augmented reality device facilitates multi-selection by employing classification of objects tagged in the manner just described. For example, after a user tags an object with a second cursor 112a, the augmented reality device may automatically tag similar objects within the scene 102. For example, after the user tags a first person 104a, the system might automatically tag the other two people 104b,c within the scene. In another instance, eye gaze gestures are assisted based on the classification, for example by "snapping" the active cursor 110 onto objects in the same class as those recently tagged, and avoiding other object 106 not similar to objects that were recently tagged.

An augmented reality cursor may undergo various modal transformations. Examples of these are provided by FIG. 2, which illustrates an example of modal switching of an augmented reality cursor, in accordance with an embodiment.

Figure 2:
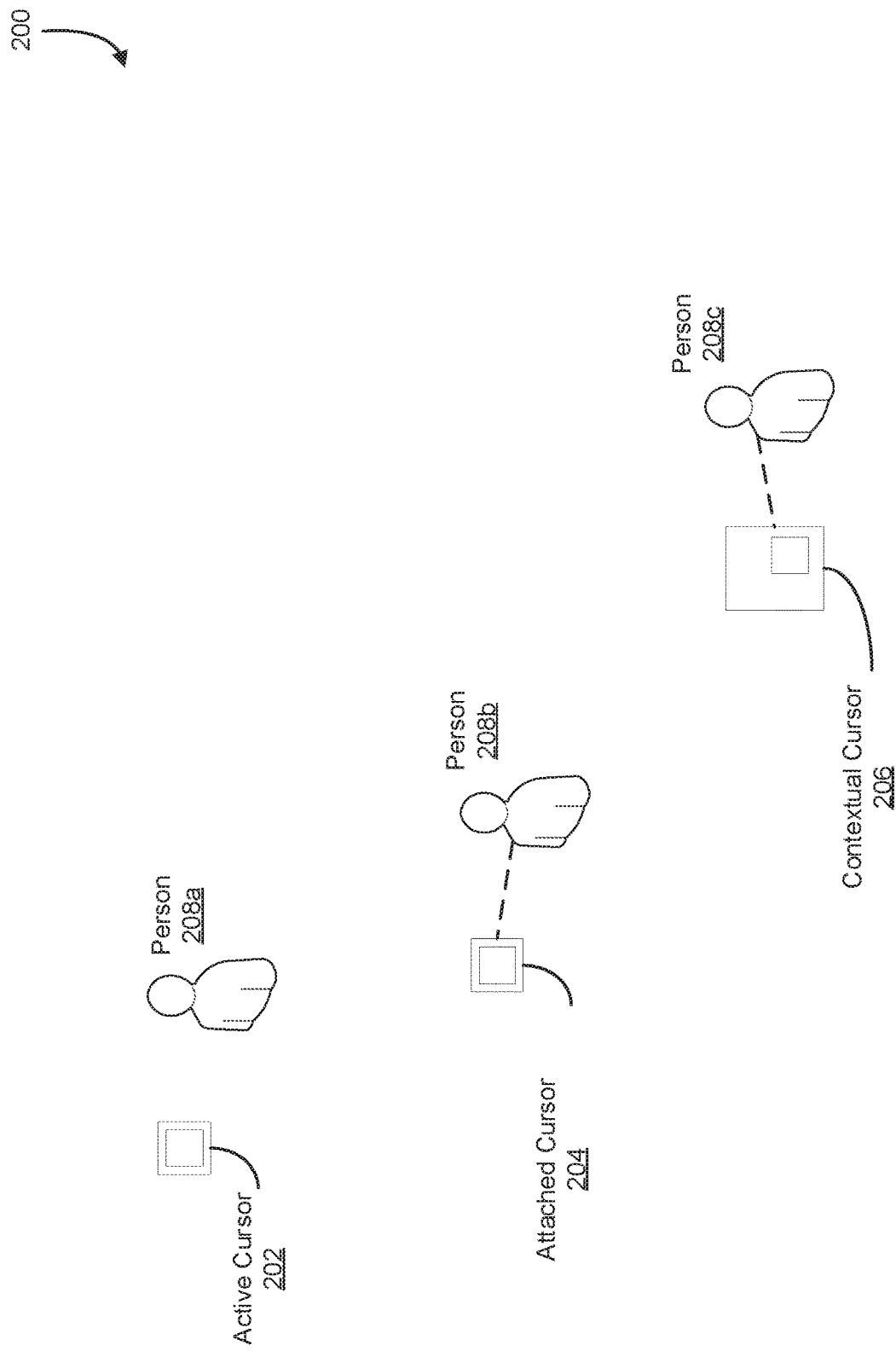
FIG. 2 illustrates an example of modal switching of an augmented reality cursor, in accordance with an embodiment.

As depicted by the example 200 of FIG. 2, one mode of an augmented reality cursor is that of an active cursor 202. In the example 200, an active cursor 202 is one that may be moved about an augmented reality scene, such as the scene 102 depicted in FIG. 1, and place in the proximity of various objects, such as near a person 208a.

As depicted by the example 200 of FIG. 2, another mode of an augmented reality cursor is that of an attached cursor 204. In the example 200, an attached cursor 204 is one that has been linked to an object, such as the depicted person 208b. An attached cursor 204 can be used to indicate that the object is in a selected state, after the active cursor 202 has been moved to focus on another object within the scene.

In an embodiment, the attachment of a cursor 204 and person 208b is reflected by graphical indications in the scene depicted by the augmented reality device. For example, the attached cursor 204 may move about the scene so that it tracks the movement of the person 208b to which the cursor is attached. In other words, the indication of the selected state provided by the attached cursor 204 remains proximate to a selected object, even as the position of that object moves around in the augmented reality scene. This may be accomplished based, at least partly, on the various services depicted in FIG. 12.

In an embodiment, the attachment of the cursor 204 is indicated by a line drawn in the scene between the person 208b and the attached cursor 204. In other embodiments, attachment is indicated by other graphical indicia, such as a change to the color of the object, textual displays (e.g. textual displays identifying the object to which the cursor is attached), a marker positioned near the object, and so forth.

As depicted by the example 200 of FIG. 2, another mode of an augmented reality cursor is that of a contextual cursor 206. The contextual cursor 206, in an embodiment, is a cursor whose mode has changed based on one or more factors including 1) object(s) identified in the proximity of the cursor, 2) information obtained about object(s) in the proximity of the cursor, 3) attachment to an object, and 4) input gestures, including eye movement or the cessation of eye movement, speech, and various physical gestures.

In an embodiment, the contextual cursor 206 represents extended modes of interacting with an attached object, in this case the attached person 208c. The extended modes of interacting can include facilities for zooming in, making more refined selections, making multiple choice selections, and so forth. In some instances, the contextual cursor may convey information using graphical indicia, with or without changing its mode of user input.

In an embodiment, a contextual cursor can be attached to an object and can maintain its state even when no longer active. For example, an active cursor 202 might switch modes to become a contextual cursor 206 which facilitates multiple-choice selection. These selections can be preserved and displayed even when the active cursor has moved on to facilitate interaction with other objects. A first contextual cursor might indicate that "Choice A" has been tentatively applied to a first object, and "Choice B" has been applied to a second object. The user of the augmented reality device might then perform a gesture which causes the selected choices to be applied en masse to each object that has an associated contextual cursor.

Figure 3:
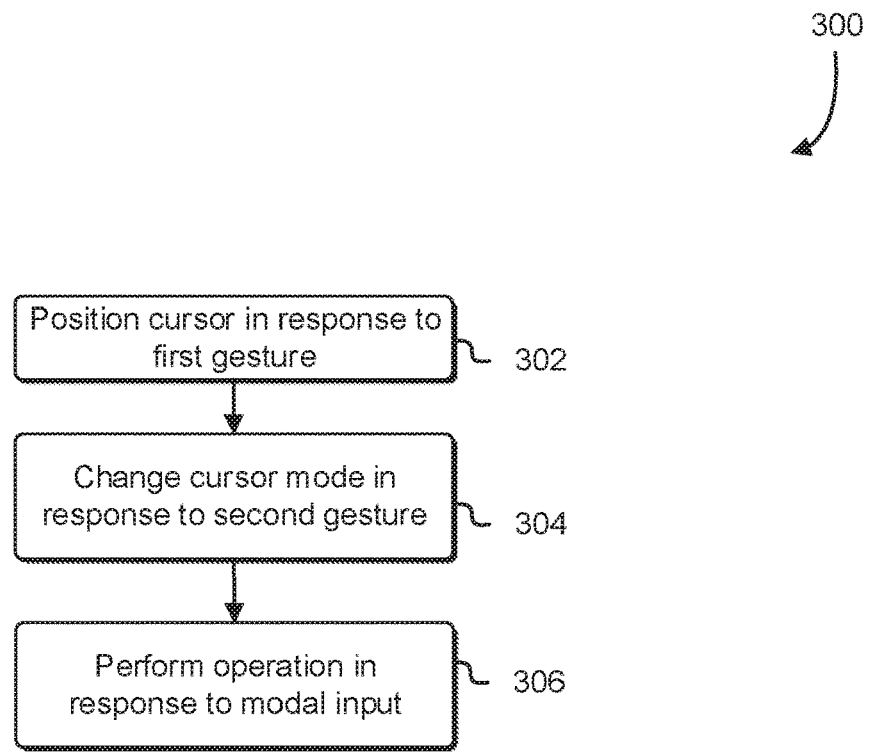
FIG. 3 is a flowchart that illustrates an example procedure for modal switching of an augmented reality cursor, in accordance with an embodiment.

FIG. 3 is a flowchart that illustrates an example procedure for modal switching of an augmented reality cursor, in accordance with an embodiment. Some or all of the process 300 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 300 may be performed by an augmented reality device comprising a non-transitory computer-readable storage medium on which executable instructions are stored, and one or more processors capable of executing the instructions. In some embodiments, the augmented reality device may work in conjunction with remote services provided by a server in a data center. For example, the augmented reality device may perform some functions using various components of the environment 1400 described in conjunction with FIG. 14, such as the one or more web servers 1406 or the one or more application servers 1408.

The process 300 includes a series of operations wherein an augmented reality cursor is positioned, changes mode, and performs an operation in response to modal input.

At 302, the augmented reality device positions a cursor in response to a first gesture. This operation may in some respects be analogous to positioning a cursor in a graphical desktop environment. However, there are a number of differences. For example, the scene is representative of a three-dimensional environment, and as such, the positioning of the cursor accounts for the location of the object in all three dimension. In an embodiment, movement of the cursor within this space is done in two-dimensions, and depth of the cursor (and any selections made by it) inferred by proximity. For example, the device might select an object that is nearest in the z dimension to the two-dimensional plane of an x, y dimension in which the cursor moves. The two-dimensional plane might be located nearest to the user, e.g. at z-O.

In another embodiment, movement of the cursor is in three dimensions. In embodiments, movement in the third dimension may be facilitated by the augmented reality device, based on the z positions of identified objects. For example, as the cursor moves, it may be moved in the z direction by the device, based on the z location of an identified object.

At 304, the augmented reality device changes the cursor mode in response to a second gesture. In an embodiment, the mode change comprises a shift to a contextual mode that relates to an object in the proximity of the cursor when the second gesture was performed or otherwise activated. Another example of a mode shift is a transition to a multi-select mode. For example, the cursor may first be positioned by the user using an eye movement gesture. Then, in response to the user pausing movement of his or her gaze, the augmented reality device changes the mode of the cursor to a "tag mode" indicated by some form of graphical indicia, and becomes either attached to a nearby object or fixed to some location in the scene.

At 306, the augmented reality device performs an operation in response to modal input. In an embodiment, this might comprise accepting a multiple-choice input selection, or accepting a more refined selection via a magnifying glass tool. Other examples are provided herein. In an embodiment of the "tag mode" just described, the operation might comprise splitting off a new cursor in response to the user resuming eye movement. It will, of course, be appreciated that these examples are intended to be illustrative, and as such should not be construed so as to limit the scope of the present disclosure to only the specific examples provided.

Figure 4:
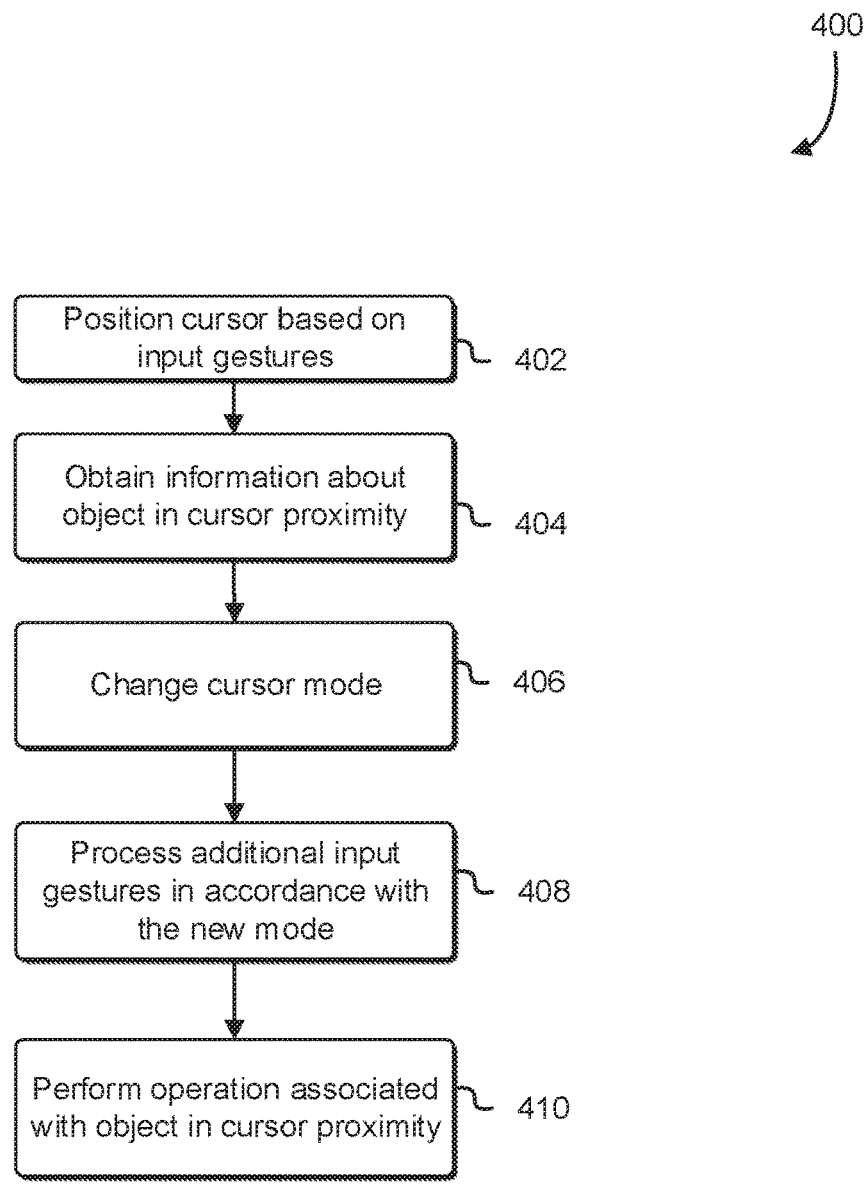
FIG. 4 is a flowchart that illustrates an additional example procedure for modal switching of an augmented reality cursor, in accordance with an embodiment.

FIG. 4 is a flowchart that illustrates an additional example procedure for modal switching of an augmented reality cursor, in accordance with an embodiment. Some or all of the process 400 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 400 may be performed by an augmented reality device comprising a non-transitory computer-readable storage medium on which executable instructions are stored, and one or more processors capable of executing the instructions. In some embodiments, the augmented reality device may work in conjunction with remote services provided by a server in a data center. For example, the augmented reality device may perform some functions using various components of the environment 1400 described in conjunction with FIG. 14, such as the one or more web servers 1406 or the one or more application servers 1408.

The process 400 includes a series of operations wherein an augmented reality cursor is positioned and changes mode based on an object in the proximity of the cursor.

At 402, the augmented reality device positions the cursor based on input gestures. Example input gestures include eye movement, head movement, device input, such as from a joystick, trackpad, or capacitive touch screen, or various other devices or mechanisms.

At 404, the augmented reality device obtains information about an object in proximity to the cursor. The information may be derived from a multi-stage process which can include 1) determining whether the cursor is near an object; 2) determining a class of object, e.g. person, landmark, sign, and so forth, 3) determining an identity of the object, i.e. the name of the person, landmark, or sign; 4) determining what information sources are available about the object; and 5) obtaining information from the information sources.

At 406, the cursor mode changes based on the available information. In an embodiment, the cursor changes based on the class of object. In another embodiment, the cursor changes based on the identity of the object and/or the information available about the object.

At 408, additional input gesture(s) are received and processed in accordance with the new cursor mode. Generally speaking, this step involves identifying an operation to perform based on the mode of the cursor and the type and qualities of the input gesture. For example, in an embodiment the cursor might have changed to a "tag/split" mode, such that subsequent cursor movement indicates that a tag should be left behind and attached to proximate object, while a new cursor splits off and is moved elsewhere. In another example, the cursor has changed to a refined selection tool, and subsequent input is interpreted so as to identify the refined selection.

At 410, the augmented reality device performs an operation associated with the object(s) in proximity to the cursor. For example, in the case of the tag/split mode, the tag may be associated with the object(s).

Figure 5:
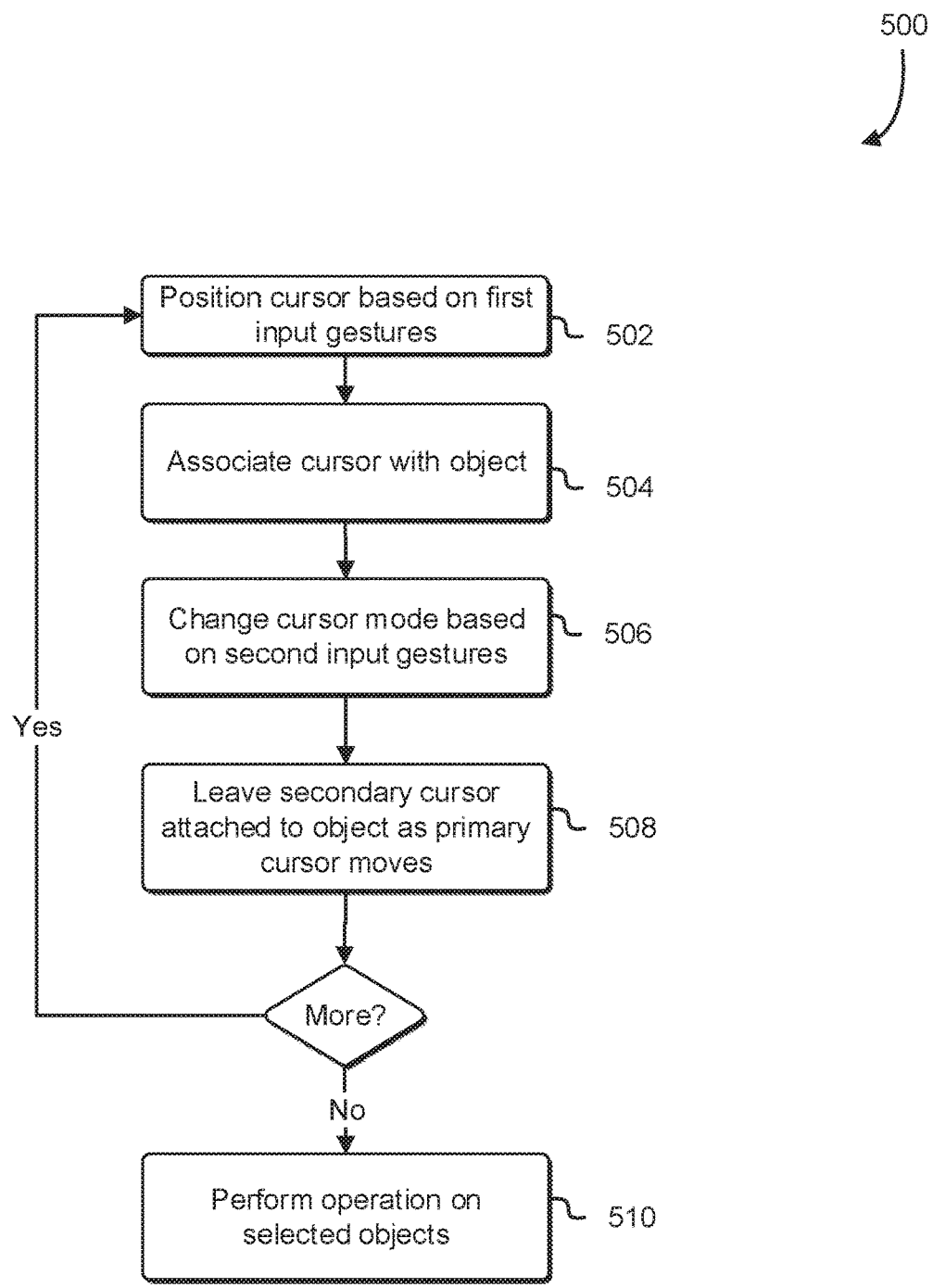
FIG. 5 is a flowchart that illustrates an example procedure for multi-selection with an augmented reality cursor, in accordance with an embodiment.

Further aspects of the "tag/split" cursor mode may be understood in view of FIG. 5, which is a flowchart that illustrates an example procedure for multi-selection with an augmented reality cursor, in accordance with an embodiment. Some or all of the process 500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 500 may be performed by an augmented reality device comprising a non-transitory computer-readable storage medium on which executable instructions are stored, and one or more processors capable of executing the instructions. In some embodiments, the augmented reality device may work in conjunction with remote services provided by a server in a data center. For example, the augmented reality device may perform some functions using various components of the environment 1400 described in conjunction with FIG. 14, such as the one or more web servers 1406 or the one or more application servers 1408.

The process 500 includes a series of operations wherein an augmented reality cursor is used to select multiple objects.

At 502, a cursor is positioned within an augmented reality scene based on first input gestures and information derived therefrom. Examples include, but are not limited to, eye movement and estimated gaze direction. For example, the augmented reality device may track movement of a user's eyes, estimate the user's gaze direction, and thereby identify a location in the augmented reality scene. The cursor may be placed at a position indicated by the user's gaze direction. In embodiments, positioning is assisted by the services depicted in FIG. 12, which can identify objects of interest in the augmented reality scene. The positioning of the cursor can then be guided to the object of interest. For example, the classification of an object can be combined with the user's gaze direction, and this combination used to refine positioning of the cursor.

At 504, the cursor is associated with an object in its proximity. This may proceed in accordance with the procedures described herein, such as those procedures involving the classification and identification of objects. This can be separate from, or combined with, the positioning of the cursor. In either case, an object that is near to the cursor can be identified as a potential object for selection.

At 506, the mode of the cursor is changed based on second input gestures. For example, in response to a pause in eye movement, the cursor might change to "tag/split" mode. Here, "tag/split" mode refers to a gesture that indicates that the object should be tagged as selected, and that the cursor should be allowed to move on to another object for possible selection. The cursor is described as being "split" because a secondary cursor, or other visual indication, is left in place on the selected object when the cursor is moved on to another object.

For example, at 508, a secondary cursor is attached to the object. The secondary cursor might, for example, be a tag attached to the object to indicate that the object has been selected, or some other visual indicia of the object's selected state. The primary cursor, which may also be referred to as the active cursor, may then continue to move about the scene.

The operations 502 to 508 may be repeated as necessary until all of the intended objects have been selected. For example, in a scene of a conference room, the user might select each person in the conference room he or she was unfamiliar with.

At 510, an operation may be performed on all of the selected objects. Continuing the prior example, background information might be retrieved for each of the selected people. The operation may be performed in response to some additional gesture. For example, eye movement may be used to position the primary cursor, a pause in eye movement may cause an object to be tagged, and a verbal command used to trigger an action, such as retrieving the background information for the selected people. It will be appreciated that these examples are intended to be illustrative, and as such should not be construed so as to limit the scope of the present disclosure to only the specific examples provided.

In some cases and embodiments, the cursor mode may change to one adapted to particular modes of selection, such as those based on a classification of objects in the scene. For example, after a first object is selected, subsequent cursor movement and selection might be limited to objects in the same class as the first object. This may be facilitated by identification of the objects via the services depicted in FIG. 12.

Figure 6:
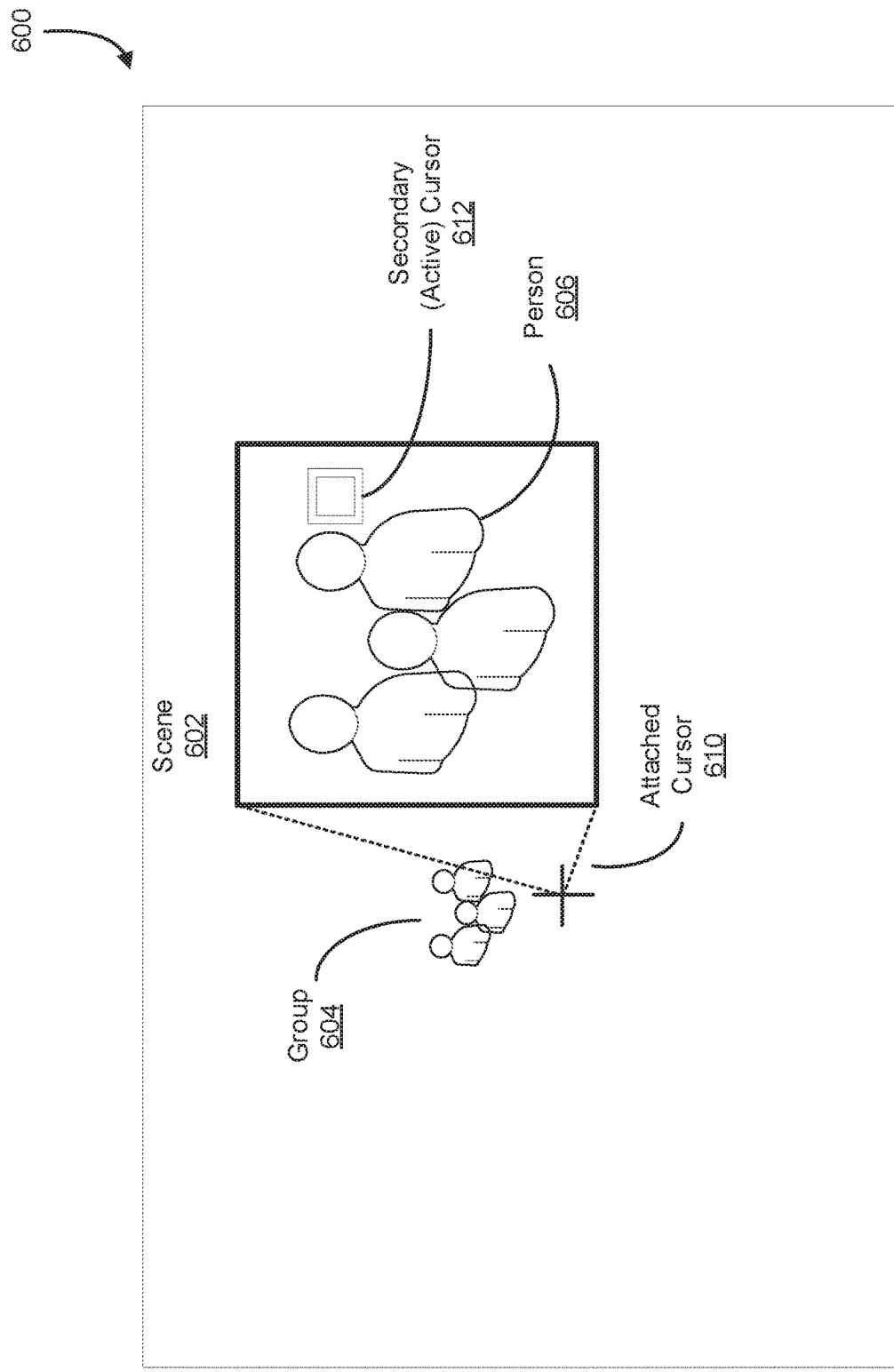
FIG. 6 illustrates an example of an augmented reality cursor mode, in accordance with an embodiment.

FIG. 6 illustrates an example of an augmented reality cursor mode, in accordance with an embodiment. In the example 600 of FIG. 6, a scene 602 comprises a group 604 of three people. However, because the group is somewhat distant and clustered together, it might be difficult for the user to position the cursor on any particular individual. To facilitate this type of selection, the cursor mode may change to one in which the relevant portion of the scene is enlarged.

In an embodiment, a cursor 610 is positioned near the group 604. The augmented reality system determines that the cursor is proximate to a group, and then changes the cursor mode to a "magnifying glass" mode. At this point, the cursor 610 becomes attached to the group, so that it remains visually connected to the group even as the position and orientation of the device, or the position of the group, changes. At the same time, a secondary cursor 612 becomes active within the magnifying glass. The secondary cursor 612 may be moved about within the magnified area, and positioned near a particular person 606. This process is facilitated by the magnification. The person 606 may then be tagged using procedures similar to those described herein for the non-magnified case.

More generally, the augmented reality system may change the supported mode of interaction with an object in response to various events, and then process subsequent gestures in accordance with the changed mode of interaction. Examples of such events include user gestures, classification of the selected object, input from another user, and so on. Subsequent gestures include those pertaining to the selection of an action supported by the current mode of interaction.

In augmented reality, there may be instances in which users may wish to share cursor state information. Unlike conventional desktop applications, an augmented reality scene may be viewed simultaneously by any number of users, although from different perspectives. Cursor positions, modes, and selections may therefore be useful to users other than the user exercising primary control over a cursor. For example, a first user might use cursor positioning and selection to indicate "look over here" or "take a look at these," for example.

Figure 7:
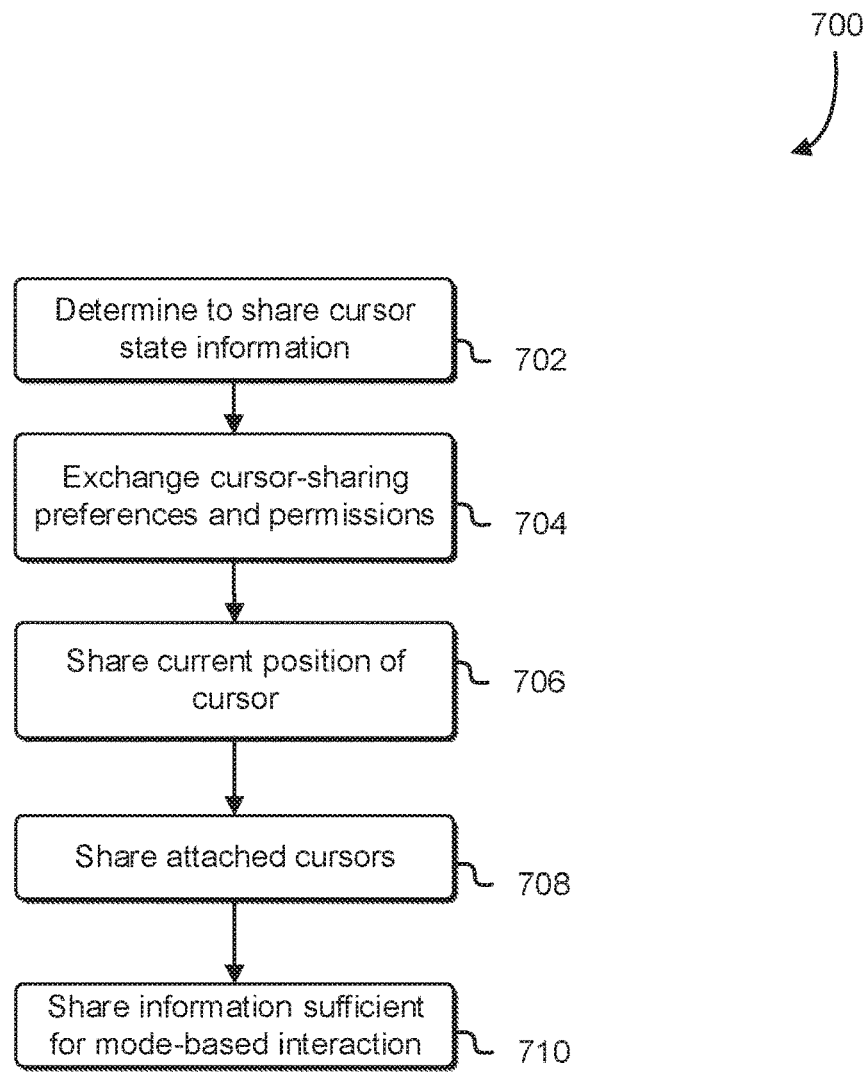
FIG. 7 is a flowchart that illustrates an example procedure for sharing augmented reality cursor states, in accordance with an embodiment.

In an embodiment, selections and other cursor states are shared between augmented reality devices. FIG. 7 is a flowchart that illustrates an example procedure for sharing augmented reality cursor states, in accordance with an embodiment. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 700 may be performed by an augmented reality device comprising a non-transitory computer-readable storage medium on which executable instructions are stored, and one or more processors capable of executing the instructions. In some embodiments, the augmented reality device may work in conjunction with remote services provided by a server in a data center. For example, the augmented reality device may perform some functions using various components of the environment 1400 described in conjunction with FIG. 14, such as the one or more web servers 1406 or the one or more application servers 1408.

The process 700 includes a series of operations wherein state information for augmented reality cursors is exchanged with other devices. For example, cursor selections and cursor modes may be shared between augmented reality devices.

At 702, the augmented reality device determines to share cursor state information. In an embodiment, this occurs in response to entering certain modes of operation, such as a collaboration mode.

At 704, devices which are to share cursor state information exchange preferences and permissions. These may be based on various considerations, including user preference and the mode of interaction between the devices. For example, some users might find it confusing if presented with multiple, moving cursors within a scene. For these users, sharing of active cursors might be disabled. The same users, however, might wish to see which objects other users have selected. Accordingly, state information for tags or other attached cursors might be provided. Other users might wish to not share the position of their primary cursor. For example, this information might be considered sensitive, since it might be based on gaze or suggest that the user is retrieving information about a person. For these users, state information for their active cursors might also be disabled.

At 706, position information for cursors is shared. As noted above, this might be done selectively, or for a brief period of time, due to user preferences or privacy concerns. For example, cursor information might be shared with other users for a brief period in response to a "look over here" command. More generally, sharing of cursor state information, including selection information, may be made during a session whose length may be determined by various factors such as user preference and context. Here, context may include the user's location, objects that have been identified, and so forth.

At 708, information about attached cursors is shared. The following process may be used 1) classification and identification information is shared; 2) information indicating which cursors have been attached to which objects is shared, and 3) any additional information necessary to support modal operations is shared. Regarding the last step, this may involve providing information about the object, such that operations indicated by the cursor mode can be performed on the device with which the cursor information is shared. For example, if a cursor mode supports a command to retrieve in-depth information about an object, and said retrieval is done using a URL known to the first device, this URL might be shared with other devices in order to allow the users of those devices to independently retrieve the information.

At 710, additional information is shared to enable mode-based interaction on the recipient device. When sharing the cursor, embodiments may also share information relevant to the mode(s) of the cursor that is being shared. For example, information about the identity of an object and the services that object provides might be available to a first device. A cursor may be attached to this object, and its mode set based on the information about the object. This information can be shared with another device when the cursor is shared, so that each user is provided with a similar set of available functionality.

Figure 8:
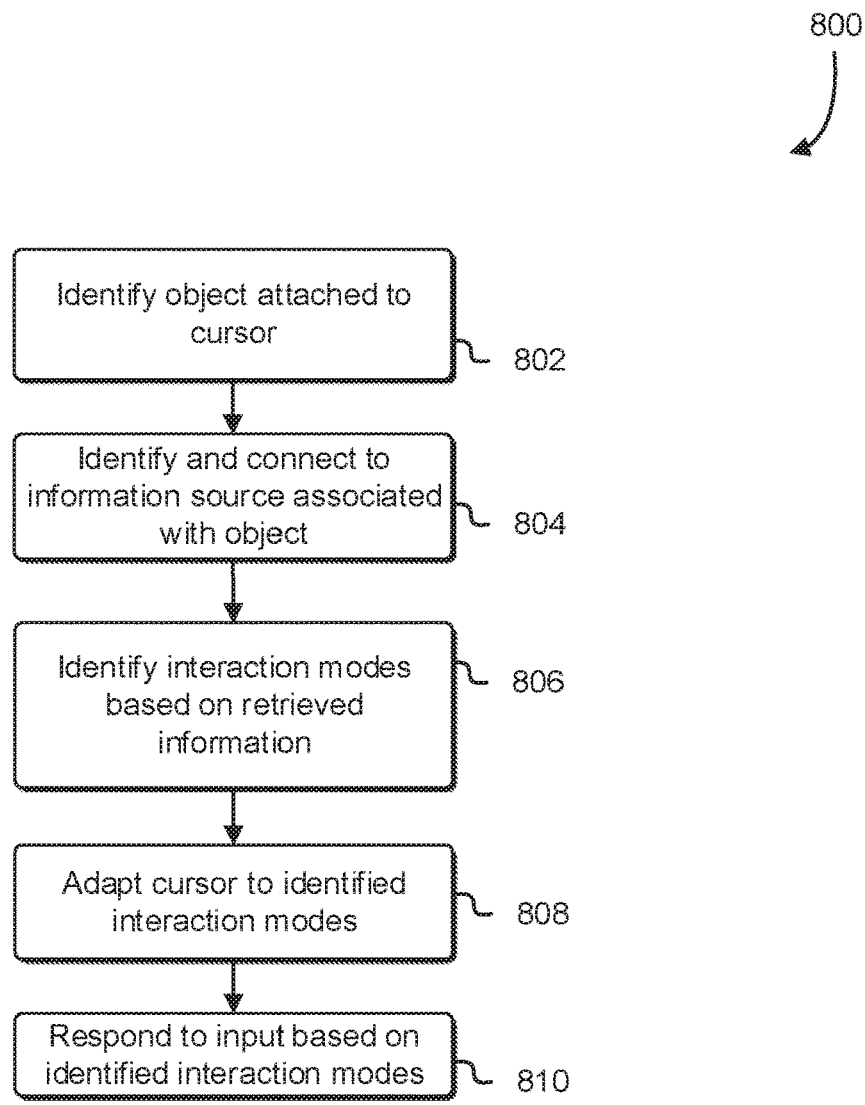
FIG. 8 is a flowchart that illustrates an additional example procedure for modal switching of an augmented reality cursor based on evolving information states, in accordance with an embodiment.

In some instances, cursor modes may evolve or change over time based on the information available about an object. FIG. 8 is a flowchart that illustrates an additional example procedure for modal switching of an augmented reality cursor based on evolving information states, in accordance with an embodiment. Some or all of the process 800 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 800 may be performed by an augmented reality device comprising a non-transitory computer-readable storage medium on which executable instructions are stored, and one or more processors capable of executing the instructions. In some embodiments, the augmented reality device may work in conjunction with remote services provided by a server in a data center. For example, the augmented reality device may perform some functions using various components of the environment 1400 described in conjunction with FIG. 14, such as the one or more web servers 1406 or the one or more application servers 1408.

The process 800 includes a series of operations wherein cursor state and available modes of interaction with an object evolve or change over time, as additional information becomes available.

At 802, an object attached to a cursor is identified. Here, identification can refer to various levels of identification. For example, and object may be classified as a person, landmark, sign, device, and so forth. At a greater level of identification, the name of a person or landmark may be determined, the meaning of a sign determined, the type of device identified, and so forth. In some cases, further information may be obtainable, such as the model number of the device, contact information for a person, and so forth.

At 804, an information source associated with the object is identified and connected to. For example, individuals may be associated with hosted information feeds that are accessible via a network, such as the internet. The information may, for example, be hosted by a cloud-based computing environment. Likewise, devices may have user manuals, operating codes, and other information available from a hosted service. These sources of information can, in some cases, be determined based at least partly on the identity of the object. In other cases, environmental clues, such as QR codes, might be leveraged.

At 806, various modes of interacting with the object can be identified based on the retrieved information. For example, some devices, such as televisions, might support a remote control mode, or be able to provide supplementary information related to the current programming. The cursor mode can change to indicate the available interaction opportunities.

Note that in some cases, environmental information may also be utilized. For example, the augmented reality device might identify, based on visual information, that a television is displaying a sports program, and then determine that a possible mode of interaction with the television is the display of a supplementary scoreboard corresponding to the sports program.

At 808, the augmented reality device response to input based on the identified interaction modes, and at 810, responds to input based on the identified interaction modes.

Figure 9:
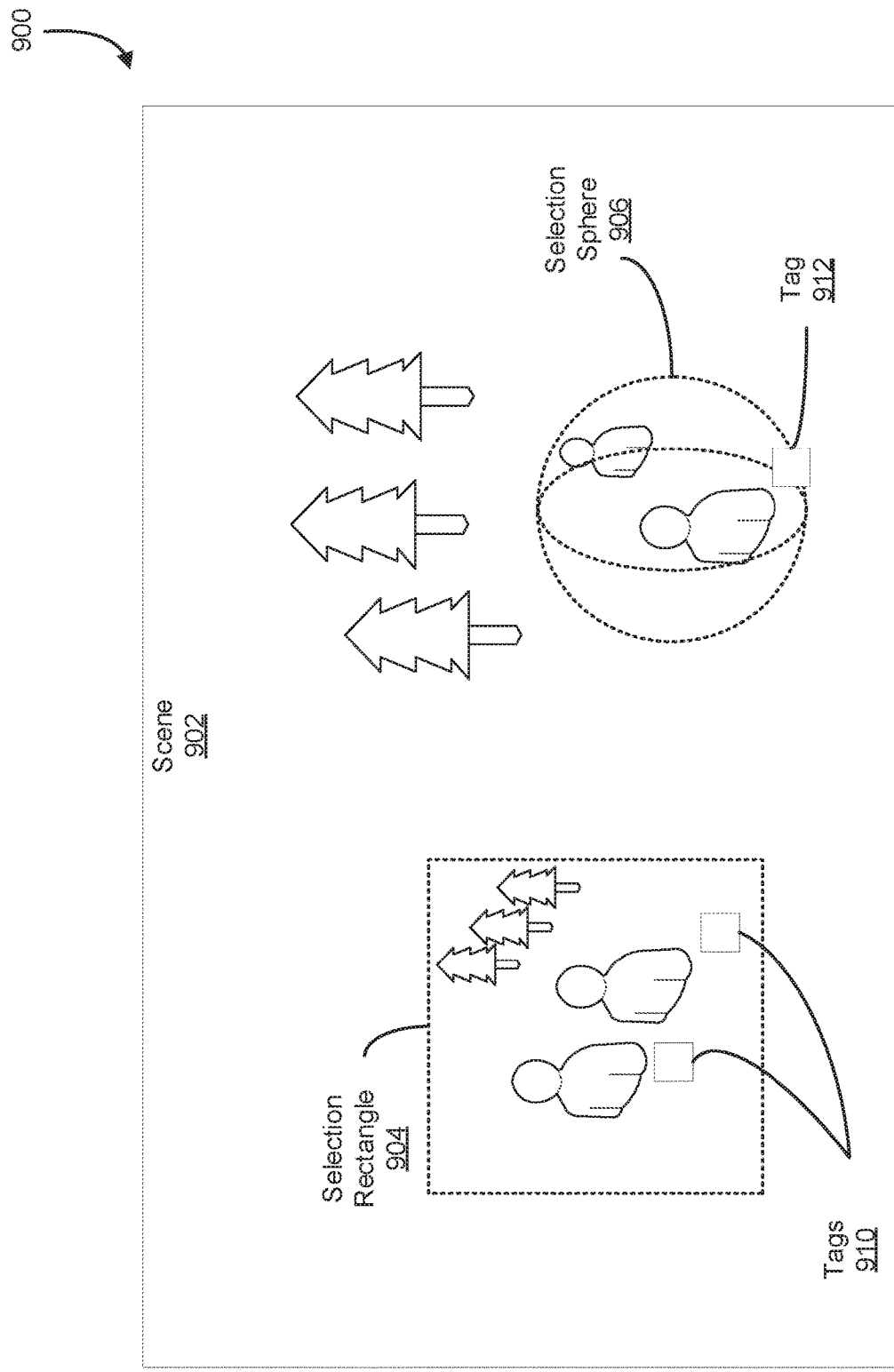
FIG. 9 illustrates an example of multi-selection in augmented reality, in accordance with an embodiment.

Various embodiments may also support multi-selection of objects through an area selection paradigm. FIG. 9 illustrates an example of multi-selection in augmented reality, in accordance with an embodiment.

In the example 900, a scene 902 comprises a variety of objects. Note that the scene 902 is three-dimensional, but projected onto a 2-dimensional screen. In some instances, selecting objects within an area is problematic because far-away or unrelated objects can be unintentionally included. To facilitate selection of an appropriate set of objects within a selected area, various techniques described herein may be employed.

One such technique is to employ a selection rectangle 904. As depicted in FIG. 9, a selection rectangle defines a two-dimensional region that has been extended over various objects, including trees and people. The rectangle may be extended based on various input gestures, such as by a combination of eye movement and an input device, such as a button or trigger, to enable a click-and-drag operation. Objects within the two-dimensional region defined by the rectangle 904 can be treated as targets for selection.

Note, however, that within the selection rectangle 904, tags 910 have been associated with the people and not the trees, even though both are within the selection rectangle 904. In various embodiments, the augmented reality device employs a variety of techniques, in various combinations, to perform the differentiation.

In an embodiment, depth of objects within the scene is determined and used to make an appropriate multi-selection. For example, in FIG. 9 the people within the selection rectangle 904 may be somewhat closer to the device than the trees. The augmented reality device may therefore employ an algorithm in which objects within some threshold range of the device are selected, whereas those beyond the threshold range are not selected.

In another embodiment, objects with similar depth are selected, whereas objects with dissimilar depths are not selected. For example, once it is established that one of the people within the selection rectangle should be selected, using any of the various means described herein, other objects having similar depths should also be selected.

In an embodiment, object classification is used. When a selection rectangle is placed over an area, the augmented reality device can classify objects within an area and infer that the user meant to select only certain types of objects within the area. For example, the augmented reality device might determine that only objects identified as people should be selected.

In an embodiment, a three-dimensional selection area is used. For example, FIG. 9 depicts a selection sphere 906 used to place a tag 912 on one individual within the area of the sphere 906, but not another individual outside the three-dimensional area. The selection sphere 906 is an example of a three-dimensional space that defines targets for a selection operation.

In various embodiments, the techniques described above, including object classification, may be used to identify which objects within an area to select. For example, based on object classification, people within the selection sphere might be selected while other objects, such as trees, are not.

Embodiments may employ the cursor selection techniques described herein in conjunction with a goal seeking capability. Goal seeking may include the ability to facilitate the accomplishment of a user goal using an augmented reality device.

Figure 10:
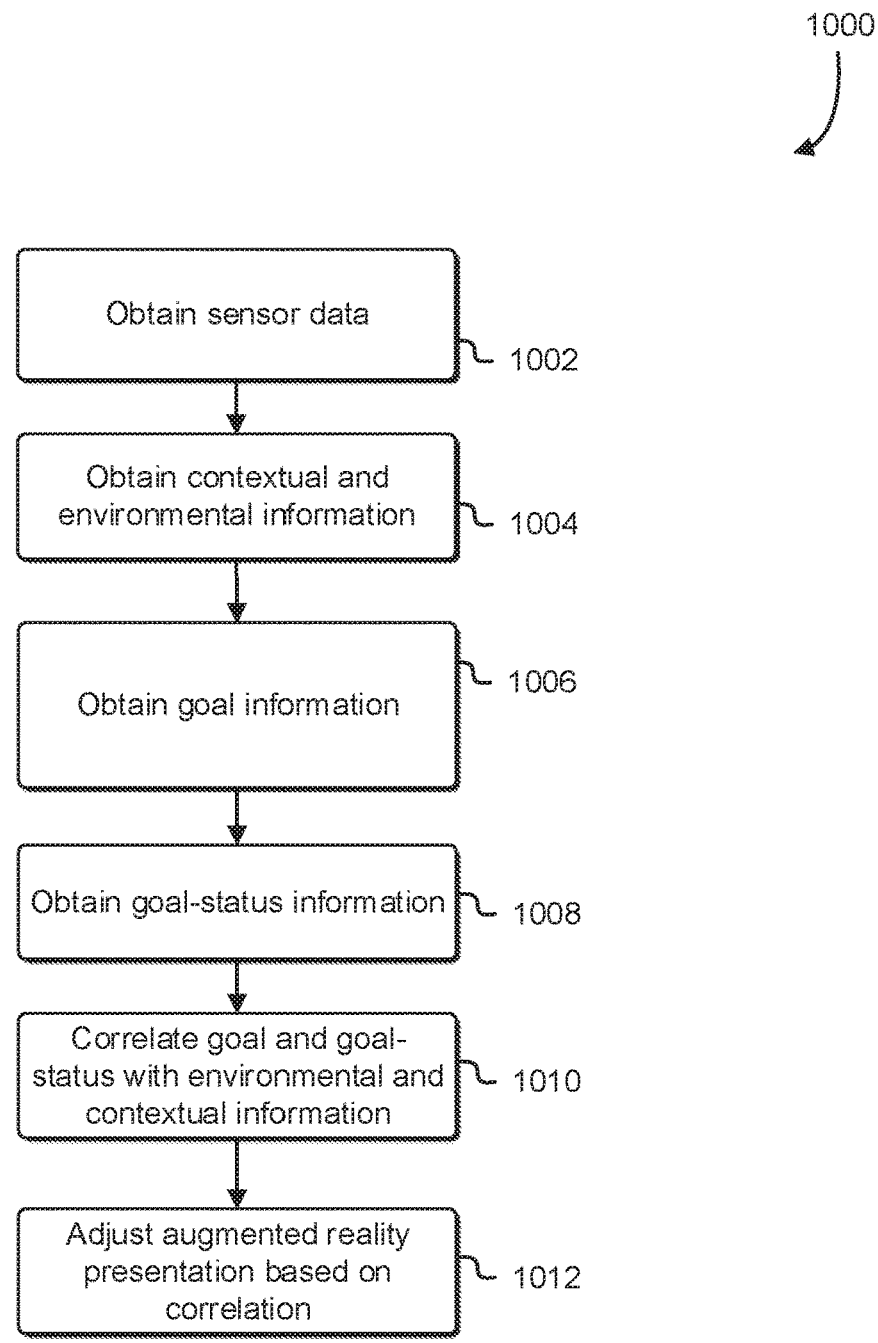
FIG. 10 is a flowchart that illustrates an example procedure for goal seeking in augmented reality, in accordance with an embodiment.

FIG. 10 is a flowchart that illustrates an example procedure for goal seeking in augmented reality, in accordance with an embodiment. Some or all of the process 1000 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1000 may be performed by an augmented reality device comprising a non-transitory computer-readable storage medium on which executable instructions are stored, and one or more processors capable of executing the instructions. In some embodiments, the augmented reality device may work in conjunction with remote services provided by a server in a data center. For example, the augmented reality device may perform some functions using various components of the environment 1400 described in conjunction with FIG. 14, such as the one or more web servers 1406 or the one or more application servers 1408.

The process 1000 includes a series of operations wherein interaction with objects in the user environment is enhanced based on a user's goals, as well as information describing the status of those goals.

At 1002, the augmented reality device obtains sensor data. Sensor data may include visual data, audio data, global positioning system data, date and time data, and so on, relating to the surrounding environment. This sensor data may be processed using the various services depicted in FIG. 12.

At 1004, the augmented reality device obtains contextual and environmental information. In various embodiments, the augmented reality device employs the mechanisms described herein to identify objects within the environment, determine the identity of the objects, and determine whether further information can be derived or obtained concerning the objects. These steps may also be performed by or in conjunction with the services depicted in FIG. 12.

For example, in an embodiment an augmented reality device identifies road signs, store fronts, geographic location, location within a building (including, for example, location within a shopping mall or within a grocery store), and other information concerning a user's environment. Further information, such as products or services available in the current environment, may be obtained based on the identified objects. For example, the augmented reality device can identify the store front (using, for example, the distributed techniques described herein, particular those regarding FIG. 12), and a catalog of products or services associated with the store downloaded from a hosted service, e.g., a service accessible via the Internet, to the device.

At 1006, the augmented reality device obtains or accesses goal information. For example, the device can download information indicative of various user goals, such as completing a home renovation project, shopping for dinner, purchasing holiday gifts in a timely manner, and so on.

Note that obtaining goal information can be performed iteratively with obtaining contextual and environmental information. For example, in some embodiments the device may only access goals relevant to the current environment, as determined based on an initial set of observations. Then, having identified one or more relevant goals, the device may access further environmental or contextual information relevant to those goals.

At 1008, the augmented reality device obtains goal-status information. Goals may have various required or optional steps and components, some of which may have been completed or acquired, and some which have not. There may also be various dependencies between the various steps needed to achieve a goal. The goal may also involve multiple participants.

In an embodiment, the augmented reality device accesses state information relevant to the goals. In some instances, the goal status information may pertain to multiple participants. For example, two individuals may be cooperating to prepare a meal. One of those individuals may have partially completed the shopping necessary to prepare the meal. This information can be shared between these individuals' augmented reality devices, so that both can contribute to the completion of the goal in a coordinated fashion.

At 1010, the augmented reality device correlates the goal and goal-status information with the environmental and contextual information. In an embodiment, current goals and goal status are evaluated with respect to the user's environment, to determine if the user's environment is conducive to completing any of the current goals. Continuing the prior example, one of the individuals may have partially completed the shopping necessary to prepare the meal. When the other individual approaches a grocery store (for example, when commuting home from work), that individual's augmented reality device may 1) determine that the individual is approaching a grocery store; 2) identify products and services available at that store; 3) determine that the product or service is associated with one of the individual's goals, in this case preparing the meal, and 4) determine that the goal can be advanced using the store's available products or services.

At 1012, the augmented reality device adjusts the augmented reality presentation based on the correlation. In an embodiment, this involves the augmented reality device presenting information indicating what actions are available to the user to further accomplishment of some pending goal. For example, the device may provide a signal indicating that a grocery store is nearby, and that the store has an ingredient that needs to be purchased in order to complete the user's goal of preparing a meal.

The algorithm of FIG. 10 can be applied to numerous scenarios. Another example involves product inspection. The user of an augmented reality device may have a general goal of inspecting products in order to ensure that the inspected products comply with various regulations. As the user is inspecting various products, the augmented reality device may identify the type of product, retrieve relevant regulatory information, identify qualities of the product relevant to the retrieved regulations, and provide signals regarding compliance, non-compliance, or further steps that might be taken to further the goal of ensuring compliance.

In an embodiment, modal interactions with objects in the augmented reality scene are modified based on actions identified as potentially useful in accomplishing a goal. Continuing the example of product inspection, various features of the inspected product may be identified and marked with cursors indicative of potential actions. For example, an area of the product might be marked in the augmented reality scene with graphics indicating that a close visual inspection of the area should be conducted. The user may then perform a gesture causing the mode of the cursor to change, e.g. to a "magnifying glass mode" in which the close visual inspection can be conducted. Relevant observations can then be made, and relevant features tagged using a secondary cursor, such as is depicted in FIG. 6.

Figure 11:
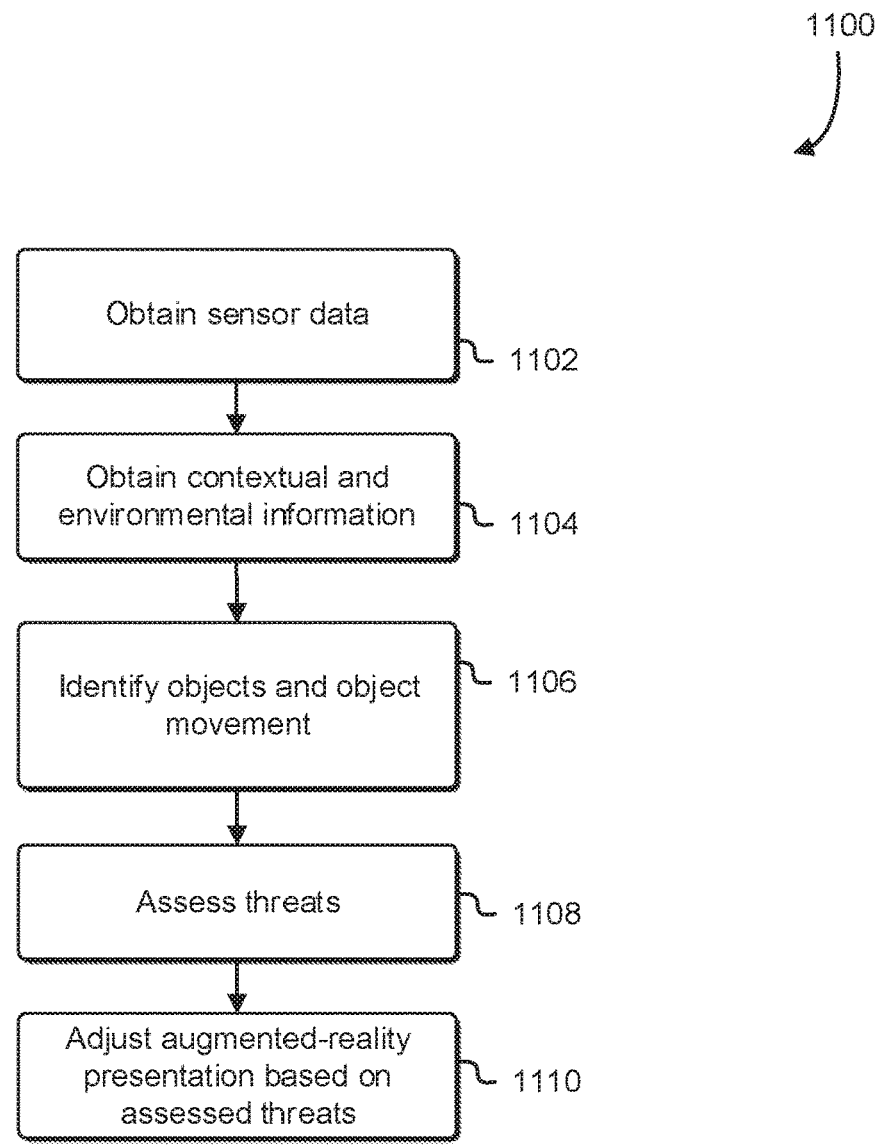
FIG. 11 is a flowchart that illustrates an example procedure for threat avoidance in augmented reality, in accordance with an embodiment.

FIG. 11 is a flowchart that illustrates an example procedure for threat avoidance in augmented reality, in accordance with an embodiment. Some or all of the process 1100 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1100 may be performed by an augmented reality device comprising a non-transitory computer-readable storage medium on which executable instructions are stored, and one or more processors capable of executing the instructions. In some embodiments, the augmented reality device may work in conjunction with remote services provided by a server in a data center. For example, the augmented reality device may perform some functions using various components of the environment 1400 described in conjunction with FIG. 14, such as the one or more web servers 1406 or the one or more application servers 1408.

The process 1100 includes a series of operations wherein sensor data collected by an augmented reality device is used to enhance user safety. The process 1100 may be partially embodied in the threat detection services 1243 depicted in FIG. 12. Note that certain of the operations attributed below to the augmented reality device may instead be performed, on behalf of the device, by the hosted threat detection services 1243.

At 1102, the augmented reality device obtains sensor data. Sensor data may include visual data, audio data, global positioning system data, time and date data, and so on, relating to the surrounding environment.

At 1104, the augmented reality device obtains contextual and environmental information. In various embodiments, the augmented reality device employs the mechanisms described herein to identify objects within the environment, determine the identity of the objects, and determine whether further information can be derived or obtained concerning the objects.

At 1106, the augmented reality device identifies objects and object movement. The augmented reality device may observe movement patterns that may be indicative of potential threats, such as movement that may result in collision, movement that indicates that the user is being followed, or movement of observed individuals, or other objects, towards areas associated with danger. In various embodiments, the user's own movement is also tracked.

At 1108, the augmented reality device assesses threats. As noted above, threats may be associated with various movement patterns. For example, the user's movement may be correlated against the movement of other individuals, automobiles, or other objects, to determine if a collision may occur. In another example, the user's movement is analyzed to determine if the user is about to move into a road or other dangerous area. In another example, an individual's movement is tracked to determine if that individual is following the user of the augmented reality device.

At 1110, the augmented reality device adjusts its presentation based on the assessed threats. Embodiments may employ various types of adjustments, depending for example on the nature of the threat.

In cases and embodiments, augmented reality features are suspended when a collision or other danger is detected.

In cases and embodiments, an alert tone is played in response to detecting a collision or other danger.

In cases and embodiments, a visual indicator such as a flash is played in response to detecting a collision or other danger.

In cases and embodiments, a directional indicator is displayed to point to a potential threat.

In cases and embodiments, a display-within-a-display feature is activated, to show a potential threat not within the user's field of view. For example, a "rear-view mirror" feature may be activated.

In cases and embodiments, a cursor is attached to a potentially threating person or object, in order to enable further actions. For example, the attached cursor might indicate that a "background check" feature is available on the individual.

In cases and embodiments, a suggested course of action is presented. For example, the augmented reality device might provide instructions for locating the nearest exit.

In cases and embodiments, sensor information is used to determine that visual navigation is difficult (e.g., due to low light or smoke in the environment), and auditory signals are provided. Alternatively, or in addition, the device provides visual navigation clues that may be used even though the physical environment is not conducive to visual navigation.

Figure 12:
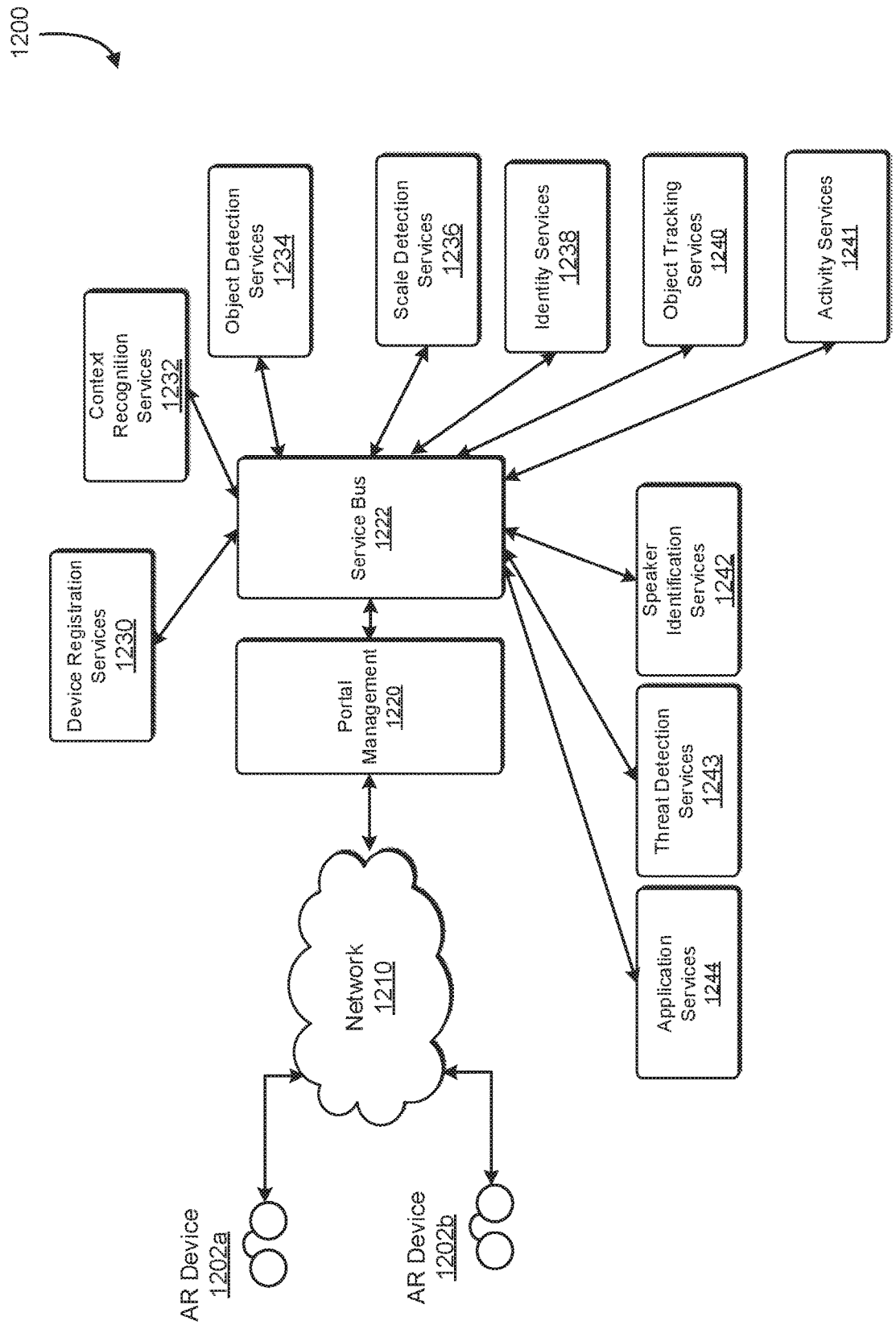
FIG. 12 illustrates an example augmented reality services platform.

FIG. 12 illustrates an example augmented reality services platform. The platform 1200 provides services to a plurality of AR devices 1202. These services may include those related to portal management, session detection, knowledge sharing, and so forth.

In an embodiment, AR devices 1202 communicate with a platform interface 1220 via at least one network 1210. The network 1210 might include wireless networks, optical networks, the Internet, and so on, individually or in combination.

Examples of AR devices 1202 include, but are not limited to, augmented reality headsets, goggles, glasses, projectors, and so forth. AR devices 1202 may also include smartphones, tablets, and so on. These devices may, in various embodiments, have limited computing capacity and operating system support, particularly in relation to multitasking. For example, support for pre-emptive multitasking, concurrent, or parallel execution of applications or threads may be limited on some of these devices.

In an embodiment, the AR devices 1202 each comprise components that provide application launching and interface services, which may also be referred to as application services or portal services. The services may include those which facilitate interaction between application windows, or portals, on an AR device 1202 and services hosted remotely.

In an embodiment, the platform interface 1220 receives the stream of events and other data from the AR devices 1202 and facilitates routing of the events, through a service 1222, to various services. The platform interface 1220 also routes output from the services back to the AR device 1202 that generated the event.

A service bus 1222 routes events and other data originating from the AR devices 1202 to various services 1230-1244. The service bus 1222, in an embodiment, employs a publish and subscribe model in which services 1230-1246 register to receive events and data associated with various applications running on the AR devices 1202.

For example, in an embodiment, an application launches on an AR device 1202a. The AR device 1202a transmits a message announcing the new application to the platform interface 1220. The AR device 1202a also transmits messages indicating which services the launching application wishes to employ. The platform interface 1220 then distributes, to the various services 1230-1246 via the service bus 1222, information indicating that a new application is starting and an indication of which services the application is to employ. The services 1230-1246, if they are to be used by the application, may then subscribe to events of various types for that application. Upon receiving an event, a service may process the event and route a response back to the originating AR device 1202a and application.

In an embodiment, the platform 1200 comprises device registration services 1230. The device registration services 1230 may include services for enrolling the device into an augmented reality experience. For example, the services may include facilities for determining when an AR device is in the proximity of a location or thing that is associated with an augmented reality experience. For example, certain geographic locations such as stores, parks, and so forth may provide augmented reality experiences to users near those things. The registration services 1230 may facilitate those experiences by providing information about device or user identity to the providers of such services.

In an embodiment, the platform 1200 comprises context recognition services 1232. These include services for improving identification and interaction with real world objects. For example, speaker identification may be improved by providing information about the context in which a voice is identified. The context recognition services 1232 might therefore, for example, provide information about a user's meeting schedule to a speaker identification process. The identification process might, for example, be more efficient when performed in view of a list of attendees at a meeting the user is currently attending.

In an embodiment, the platform 1200 comprises object detection services 1234. These include facilities for detecting and identifying objects in an augmented reality scene.

In an embodiment, the platform 1200 comprises scale detection services 1236. These include services for determining the scale of objects visible in an augmented reality scene.

In an embodiment, the platform 1200 comprises identity services 1238. These services include those pertaining to the identification of particular people, places, or things. For example, identity services 1238 might be able to provide the name of an individual observed in an augmented reality scene, the name of a landmark the user is viewing, or the name of a particular painting in a museum.

In an embodiment, the platform 1200 comprises object tracking services 1240. These services include those related to tracking a particular object as it moves, or as the viewpoint of the AR device changes. For example, object tracking services 1240 might provide services indicating where a particular object was located in a prior video frame, where the same object is located in the current video frame, and where the same object is predicted to be in a subsequent frame.

In an embodiment, the platform 1200 comprise an activities service 1241. For example, the activity service 1241 might identify an activity being engaged in, based on observed activities and/or objects. For example, a "golf swing" motion might be identified, or a golf course, and so forth.

In an embodiment, the platform 1200 comprises speaker identification services 1242. These services include those that help to associate recorded speech with the individual producing the speech.

In an embodiment, the platform 1200 comprises threat detection services 1243. These services may perform various analysis of data, such as visual analysis of data acquired by an AR device, to identify potential threats to a user of the AR device.

In an embodiment, the platform 1200 comprises portal application services 1244. These may include services for facilitating interaction with a window or portal on an AR device. Examples include, but are not limited to, services for positioning a display of data in an AR scene and adjusting the position of the display in space and time.

In an embodiment, the platform 1200 comprises application services 1244. These services may include providing abstracted representations of identified objects and their positions. For example, the application services might provide to an application a list of identified objects and information about the position and movement of those objects that is independent of the rotation and movement of the AR device user.

Figure 13:
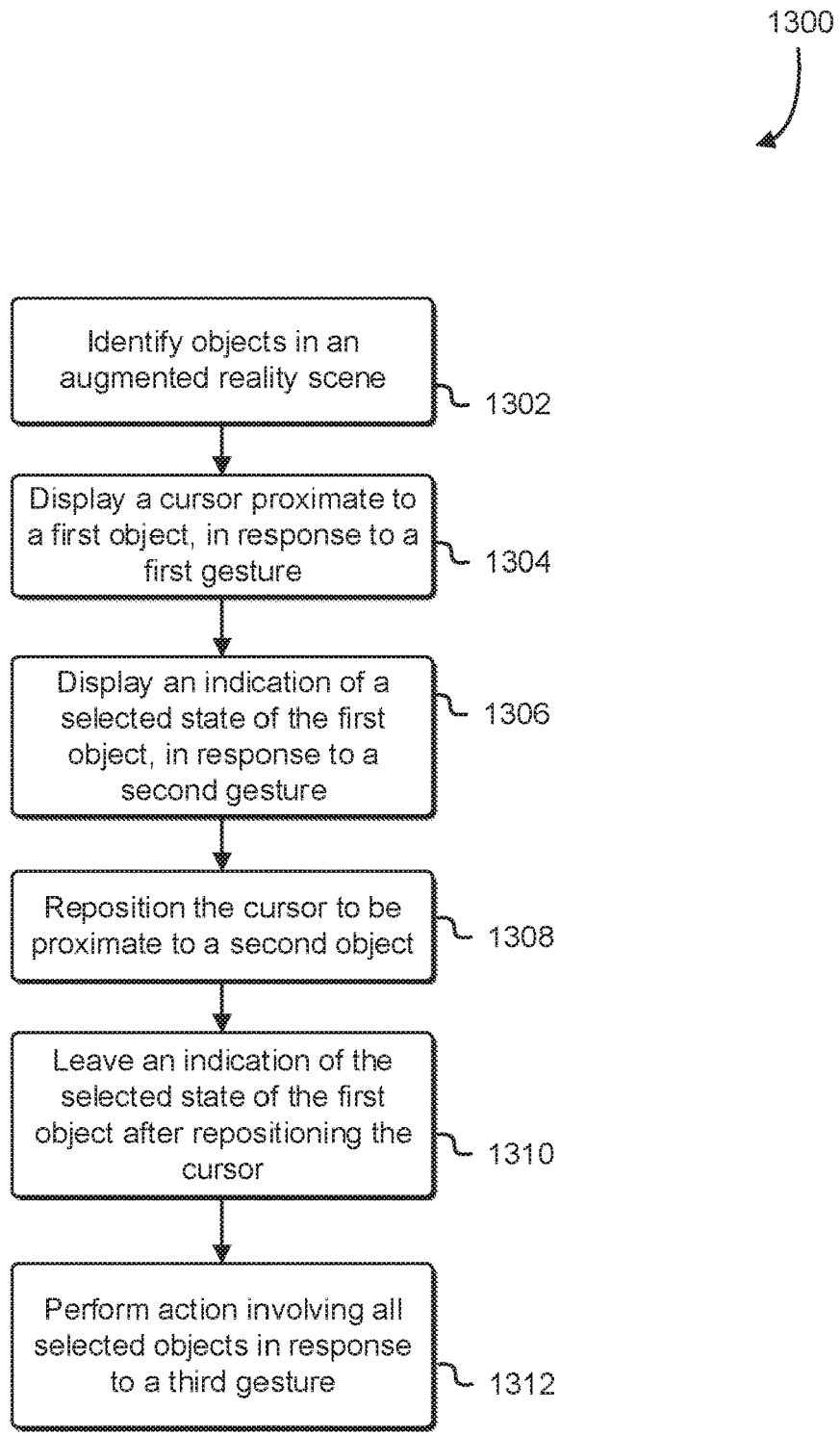
FIG. 13 is a flowchart that illustrates an example procedure for using cursors in an augmented reality environment.

FIG. 13 is a flowchart that illustrates an example procedure for using cursors in an augmented reality environment. Some or all of the process 1300 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1300 may be performed by an augmented reality device comprising a non-transitory computer-readable storage medium on which executable instructions are stored, and one or more processors capable of executing the instructions. In some embodiments, the augmented reality device may work in conjunction with remote services provided by a server in a data center. For example, the augmented reality device may perform some functions using various components of the environment 1400 described in conjunction with FIG. 14, such as the one or more web servers 1406 or the one or more application servers 1408.

The process 1300 includes a series of operations wherein objects in an augmented reality scene are identified and selected. In particular, the process 1300 is directed to selecting a plurality of objects in an augmented reality scene.

At 1302, the system identifies objects in an augmented reality scene. For example, as depicted in FIG. 12, a platform 1200 for supporting augmented reality applications may comprise various services, such as object detection services 1234 and identity services 1240.

At 1304, an augmented reality device displays a cursor proximate to a first object, of the objects identified. The augmented reality device may, for example, be either of the devices 1202 depicted in FIG. 12. The cursor may be displayed in response to a first gesture. The gesture may, for example, relate to eye movement or gaze, to indicate potential interest in the object, or in objects of the same class as the identified object. In an embodiment, an augmented reality device detects a gesture of the user, such as eye movement, hand movement, input via a joystick, button, or other device, and so on. The augmented reality device then generates gesture data to describe the gesture. The gesture data may be further processed to create an event corresponding to and describing the gesture. This event may also be referred to as gesture data.

At 1306, the augmented reality device displays an indication of a selected state of the first object, in response to a second gesture. For example, the second gesture might be a verbal command, eye movement, or input provided to a physical button or other control. The indication of a selected state may be a graphical indicia displayed on or near the selected object.

At 1308, the augmented reality device repositions the cursor to be proximate to a second object. This operation may be performed contemporaneously or in response to the operations of 1306. For example, the augmented reality device might response to an eye movement gesture by displaying an indicia of a selected state next to the first object, and moving the cursor to be proximate to a second object.

In an embodiment, device moves the cursor to the second object based, at least in part, on the second object being either of the same class of object as the first object, or being related to the first object in some way. The system may determine that an object is a candidate for selection based on the classification of the object and commonality between that classification and that of other selected objects. For example, the first or second objects might both be people, or one object might be a person and the other object might be an item thought to be owned by the selected person. It will be appreciated that these examples are intended to be illustrative rather than limiting, and as such should not be construed in a manner which would limit the scope of the intended disclosure to only those embodiments which incorporate the specific examples provided.

As depicted by 1310, the augmented reality device leaves the indication of the selected state of the first object in place when it repositions the cursor to be proximate to the second object. The second object may then be selected in response to another gesture, which may be of the same type used to select the first object. The depicted process may then be repeated, if necessary, until all of the desired objects have been selected.

At 1312, an action that involves all of the selected objects is performed. Examples of such actions include retrieving information about the selected objects, sharing information with users corresponding to or associated with the selected objects, and so forth. It will be appreciated that these examples are intended to be illustrative rather than limiting, and as such should not be construed in a manner which would limit the scope of the intended disclosure to only those embodiments which incorporate the specific examples provided.

In an embodiment, a procedure for facilitating selection of objects in an augmented reality scene is performed by a server remote to an augmented reality device. The procedure comprising receiving, from the augmented device, information indicative of the scene as observed by the device. The server determines a first position of a cursor in the augmented reality scene, and relays the determined position back to the device. The position is determined to be proximate to a first object that has been identified in an augmented reality scene. The server determines the position based on receiving, from the device, information indicating that a first gesture has been performed by the user.

The procedure further comprising the server causing the cursor to be displayed, at the first position, by an augmented reality device. Next, the server receives data indicative of a second gesture performed by the user, based on which the server determines a selected state of the first object. The server then transmits a message to the device to cause visual indication of the selected state of the first object to be displayed by the augmented reality device.

The procedure further comprises the server determining a second position for the cursor, proximate to a second object in the augmented reality scene. The determination may also be made in response to the second gesture. The server then causes the augmented reality device to display the cursor, in the augmented reality scene, proximate to the second object. Although the cursor has moved from the first object to the second object, a visual indication is left in place proximate to the first object, to indicate that the first object has been selected.

Figure 14:
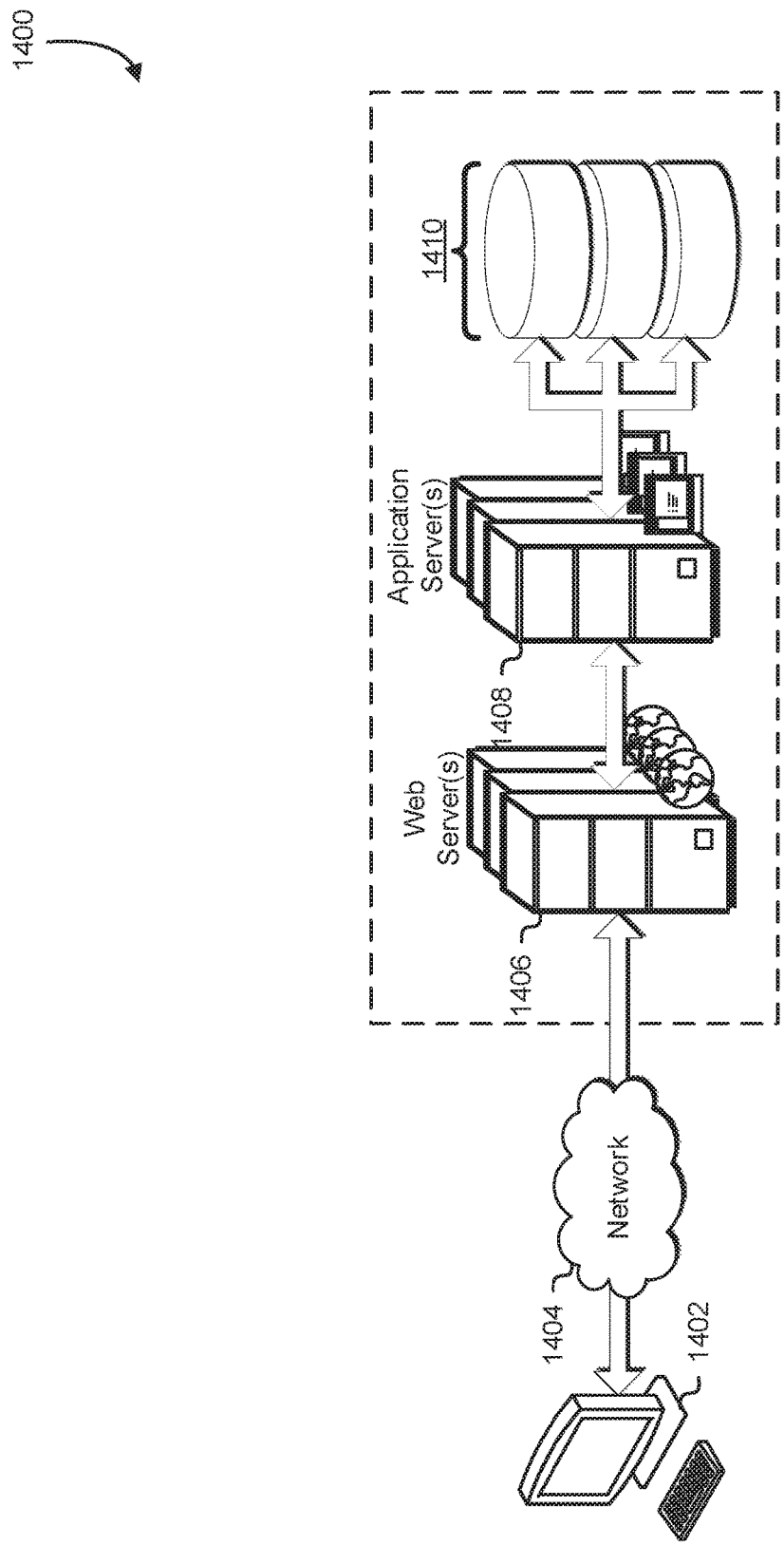
FIG. 14 illustrates an environment in which various embodiments can be implemented.

FIG. 14 illustrates aspects of an example environment 1400 for implementing aspects in accordance with various embodiments. As will be appreciated, although a web-based environment is used for purposes of explanation, different environments may be used, as appropriate, to implement various embodiments. The environment includes an electronic client device 1402, which can include any appropriate device operable to send and/or receive requests, messages, or information over an appropriate network 1404 and convey information back to a user of the device. Examples of such client devices include personal computers, cell phones, handheld messaging devices, laptop computers, tablet computers, set-top boxes, personal data assistants, embedded computer systems, electronic book readers, and the like.

The environment 1400 in one embodiment is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated in FIG. 14. Thus, the depiction in FIG. 14 should be taken as being illustrative in nature and not limiting to the scope of the disclosure.

The network 1404 can include any appropriate network, including an intranet, the Internet, a cellular network, a local area network, a satellite network or any other network, and/or combination thereof. Components used for such a system can depend at least in part upon the type of network and/or environment selected. Many protocols and components for communicating via such network 1404 are well known and will not be discussed in detail. Communication over the network 1404 can be enabled by wired or wireless connections and combinations thereof. In an embodiment, the network 1404 includes the Internet and/or other publicly addressable communications network, as the environment 1400 includes one or more web servers 1406 for receiving requests and serving content in response thereto, although for other networks an alternative device serving a similar purpose could be used as would be apparent to one of ordinary skill in the art.

The illustrative environment 1400 includes one or more application servers 1408 and data storage 1410. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" or "data storage" refers to any device or combination of devices capable of storing, accessing, and retrieving data, which may include any combination and number of data servers, databases, data storage devices, and data storage media, in any standard, distributed, virtual, or clustered environment.

The one or more application servers 1408 can include any appropriate hardware, software and firmware for integrating with the data storage 1410 as needed to execute aspects of one or more applications for the electronic client device 1402, handling some or all of the data access and business logic for an application. The one or more application servers 1408 may provide access control services in cooperation with the data storage 1410 and is able to generate content including, text, graphics, audio, video, and/or other content usable to be provided to the user, which may be served to the user by the one or more web servers 1406 in the form of HyperText Markup Language (HTML), Extensible Markup Language (XML), JavaScript, Cascading Style Sheets (CSS), JavaScript Object Notation (JSON), and/or another appropriate client-side structured language. In embodiments, graphical content, such as three-dimensional graphics content, may be transmitted in a binary data format, bitmap, vector graphics representation, compressed and/or uncompressed video frames, and so on. Content transferred to the electronic client device 1402 may be processed by the electronic client device 1402 to provide the content in one or more forms including forms that are perceptible to the user audibly, visually, and/or through other senses. The handling of all requests and responses, as well as the delivery of content between the electronic client device 1402 and the one or more application servers 1408, can be handled by the one or more web servers 1406 using PHP: Hypertext Preprocessor (PHP), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The data storage 1410 can include several separate data tables, databases, data documents, dynamic data storage schemes, and/or other data storage mechanisms and media for storing data relating to a particular aspect of the present disclosure. For example, the data storage 1410 may include mechanisms for storing various types of data and user information 1416, which can be used to serve content to the electronic client device 1402. The data storage 1410 also is shown to include a mechanism for storing log data, such as application logs, system logs, access logs, and/or various other event logs, which can be used for reporting, analysis, or other purposes. It should be understood that there can be many other aspects that may need to be stored in the data storage 1410, such as page image information and access rights information, which can be stored in any of the above listed mechanisms as appropriate or in additional mechanisms in the data storage 1410. The data storage 1410 is operable, through logic associated therewith, to receive instructions from the one or more application servers 1408 and obtain, update, or otherwise process data in response thereto. The one or more application servers 1408 may provide static, dynamic, or a combination of static and dynamic data in response to the received instructions. Dynamic data, such as data used in web logs (blogs), shopping applications, news services, and other applications may be generated by server-side structured languages as described or may be provided by a content management system (CMS) operating on, or under the control of, the one or more application servers 1408.

In one embodiment, a user, through a device operated by the user, can submit a search request for a match to a particular search term. In this embodiment, the data storage 1410 might access the user information to verify the identity of the user and obtain information about items of that type. The information then can be returned to the user, such as in a results listing on a web page that the user is able to view via a browser on the electronic client device 1402. Information related to the particular search term can be viewed in a dedicated page or window of the browser. It should be noted, however, that embodiments of the present disclosure are not necessarily limited to the context of web pages, but may be more generally applicable to processing requests in general, where the requests are not necessarily requests for content.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via the network 1404. These devices also can include virtual devices such as virtual machines, hypervisors, and other virtual devices capable of communicating via the network 1404.

Various embodiments of the present disclosure utilize the network 1404 that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), and Common Internet File System (CIFS). The network 1404 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In embodiments utilizing the one or more web servers 1406, the one or more web servers 1406 can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment 1400 can include a variety of data stores and other memory and storage media as discussed above.

These can reside in a variety of locations, such as on a storage medium local to (and/or resident in) one or more of the computers or remote from any or all of the computers across the network 1404. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit (CPU or processor), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A system comprising:
   at least one processor; and
   a memory having stored thereon executable instructions that, in response to execution by the at least one processor, cause the system to:
      display a cursor proximate to a first object in an augmented reality scene, the cursor positioned based at least in part on first gesture data;
      display a visual indication of a first selected state of the first object, based at least in part on second gesture data;
      reposition the cursor proximate to a second object, wherein the visual indication of the first selected state of the first object remains displayed after the cursor is repositioned proximate to a second object and the second object is selected for an operation to be applied to the first and second objects;
      display a visual indication of a second selected state of the second object; and
      perform an operation associated with the first and second objects, based at least in part on the first and second selected states.

2. The system of claim 1, wherein the memory has stored thereon executable instructions that, when executed by the at least one processor, cause the system to determine a classification of the first and second objects and to determine that the second object is a candidate for selection based at least in part on commonality of the classification of the first and second objects.

3. The system of claim 1, wherein the cursor is repositioned proximate to the second object based at least in part on a first classification of the first object and a second classification of the second object.

4. The system of claim 1, wherein the visual indication is based at least in part on a classification of the first object.

5. The system of claim 1, wherein the memory has stored thereon executable instructions that, when executed by the at least one processor, cause the system to:
   change a mode of interaction with the second object in response to third gesture data; and
   process additional gestures in accordance with the changed mode of interaction.

6. The system of claim 1, wherein the visual indication is indicative of a plurality of modes of interacting with the first object.

7. A computer-implemented method, comprising:
   determining a first position of a cursor, the first position proximate to a first object in an augmented reality scene, the first position determined based at least in part on first gesture data;
   causing the cursor to be displayed, at the first position, by an augmented reality device;
   determining that the first object should be associated with a selected state, based at least in part on second gesture data;
   causing a visual indication of the selected state of the first object to be displayed by the augmented reality device;
   determining a second position of the cursor, the second position proximate to a second object in the augmented reality scene;
   causing the cursor to be displayed, by the augmented reality device, proximate to the second object, wherein the visual indication of the first selected state of the first object remains displayed after the cursor is repositioned and the second object is selected for an action to be applied to at least the first and second objects;
   displaying a second visual indication of a second selected state of the second object; and performing the action on the first and second objects, based at least in part on the first and second selected states.

8. The method of claim 7, further comprising determining that the second object can be selected least in part on a classification of the first object.

9. The method of claim 7, further comprising:
identifying a plurality of objects in the augmented reality scene sharing a common classification with the first object; and
performing an action associated with the plurality of objects in response to an indication to perform the action on the first object.

10. The method of claim 7, further comprising selecting the visual indication based at least in part on a classification of the first object.

11. The method of claim 7, further comprising:
receiving third gesture data; and
changing a mode of interaction with the second object in response to the third gesture data.

12. The method of claim 11, further comprising performing an action on the first and second objects based at least in part on the changed mode of interaction.

13. The method of claim 7, further comprising:
determining at least one of a classification or identity of the second object;
obtaining information associated with second object, based at least in part on the at least one of the classification or identity; and
selecting a mode of interaction based at least in part on the obtained information.

14. The method of claim 7, wherein the visual indication is indicative of a plurality of modes of interacting with the first object, the plurality of modes based, at least in part, on an identification of the first object.

15. A non-transitory computer-readable storage medium having stored thereon executable instructions that, in response to being executed by one or more processors of a computing device, cause the computing device to at least:
display a cursor proximate to a first object in an augmented reality scene, the cursor positioned based at least in part on first gesture data;
display a visual indication of a first selected state of the first object, based at least in part on second gesture data indicating selection of the first object;
reposition the cursor proximate to a second object, wherein the visual indication of the first selected state of the first object remains displayed after the cursor is repositioned and a selected state is associated with the second object;
display a second visual indication of a second selected state of the second object; and
performing on operation on the first and second objects, based at least in part on the first and second selected states.

16. The non-transitory computer-readable storage medium of claim 15, having stored thereon further executable instructions that, in response to being executed by one or more processors of an augmented reality device, cause the computing device to at least:
display an indication that the second object can be selected, based at least in part on a common classification of the first and second objects.

17. The non-transitory computer-readable storage medium of claim 15, wherein the first gesture data comprises information indicative of a three-dimensional space in the augmented reality scene, the three-dimensional space indicative of targets for selection.

18. The non-transitory computer-readable storage medium of claim 15, wherein the first gesture data comprises information indicative of a two-dimensional area.

19. The non-transitory computer-readable storage medium of claim 15, having stored thereon further executable instructions that, in response to being executed by one or more processors of an augmented reality device, cause the computing device to at least receive an event indicative of selecting the first object.

20. The non-transitory computer-readable storage medium of claim 19, wherein the event is based at least in part on the first gesture data and a position of the first object in the augmented reality scene.

* * * * *